(12) United States Patent
Sun et al.

(10) Patent No.: US 11,303,481 B2
(45) Date of Patent: *Apr. 12, 2022

(54) SIGNAL SCRAMBLING SEQUENCE TECHNIQUES FOR WIRELESS COMMUNICATIONS

(71) Applicant: QUALCOMM Incorporated, San Diego, CA (US)

(72) Inventors: Jing Sun, San Diego, CA (US); Tao Luo, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 16/721,460

(22) Filed: Dec. 19, 2019

(65) Prior Publication Data

US 2020/0204411 A1 Jun. 25, 2020

Related U.S. Application Data

(63) Continuation of application No. 15/865,738, filed on Jan. 9, 2018, now Pat. No. 10,523,476.

(Continued)

(51) Int. Cl.
*H04J 11/00* (2006.01)
*H04L 25/03* (2006.01)
(Continued)

(52) U.S. Cl.
CPC .... *H04L 25/03866* (2013.01); *H04J 11/0073* (2013.01); *H04J 11/0076* (2013.01); *H04L 5/0094* (2013.01); *H04L 25/0224* (2013.01); *H04L 27/261* (2013.01); *H04L 27/2613* (2013.01); *H04W 80/00* (2013.01); *H04B 7/0684* (2013.01); *H04J 13/16* (2013.01);
(Continued)

(58) Field of Classification Search
None
See application file for complete search history.

(56) References Cited

U.S. PATENT DOCUMENTS 8,848,913 B2 9/2014 Gaal et al.
8,923,249 B2 12/2014 Kim et al.
(Continued)

FOREIGN PATENT DOCUMENTS

CN 102377514 A 3/2012
CN 104734835 A 6/2015
(Continued)

OTHER PUBLICATIONS

Considerations on Channel Raster for NB-IoT, Jan. 2016, 3GPP TSG RAN WG1 NB-IoT Ad-Hoc Meeting, R1-160051, pp. 1-8. (Year: 2016).*
(Continued)

*Primary Examiner* — Nicholas Sloms
(74) *Attorney, Agent, or Firm* — Holland & Hart LLP

(57) ABSTRACT

Techniques for scrambling sequence generation may provide scrambling for a reference signal, a control signal, or a data signal that is independent of a center frequency of a wireless system bandwidth. Generated scrambling sequences may allow for demodulation of signals in which a synchronization channel does not share a same center frequency as the wireless system bandwidth.

29 Claims, 17 Drawing Sheets

Related U.S. Application Data

(60) Provisional application No. 62/445,127, filed on Jan. 11, 2017.

(51) Int. Cl.
| | | |
|---|---|---|
| *H04L 27/26* | (2006.01) | |
| *H04W 80/00* | (2009.01) | |
| *H04L 5/00* | (2006.01) | |
| *H04L 25/02* | (2006.01) | |
| *H04J 13/16* | (2011.01) | |
| *H04B 7/06* | (2006.01) | |

(52) U.S. Cl.
CPC ............ *H04L 5/001* (2013.01); *H04L 5/0048* (2013.01); *H04L 5/0053* (2013.01)

(56) References Cited

U.S. PATENT DOCUMENTS

| | | | |
|---|---|---|---|
| 9,084,252 | B2 | 7/2015 | Chen et al. |
| 9,893,925 | B1* | 2/2018 | Patel .................... H04L 27/2678 |
| 10,601,627 | B2* | 3/2020 | Yi ......................... H04J 11/0069 |
| 2011/0013530 | A1 | 1/2011 | Rinne et al. |
| 2011/0237267 | A1 | 9/2011 | Chen et al. |
| 2011/0268101 | A1* | 11/2011 | Wang ...................... H04W 4/02 370/344 |
| 2013/0010716 | A1 | 1/2013 | Dinan |
| 2013/0121188 | A1* | 5/2013 | Das ........................ H04W 56/00 370/252 |
| 2014/0286286 | A1* | 9/2014 | Yamazaki ............ H04J 11/0023 370/329 |
| 2014/0341180 | A1 | 11/2014 | Liu et al. |
| 2015/0016339 | A1* | 1/2015 | You ..................... H04W 56/001 370/328 |
| 2015/0016396 | A1 | 1/2015 | Gaal et al. |
| 2015/0282183 | A1 | 10/2015 | Sverdlov et al. |
| 2015/0296486 | A1 | 10/2015 | Park et al. |
| 2016/0135179 | A1* | 5/2016 | Yin ..................... H04J 11/0069 370/329 |
| 2016/0192335 | A1 | 6/2016 | Kusashima et al. |
| 2016/0316442 | A1 | 10/2016 | Seo et al. |
| 2017/0094621 | A1 | 3/2017 | Xu et al. |
| 2017/0150370 | A1 | 5/2017 | Zhang et al. |
| 2017/0251475 | A1* | 8/2017 | Ahn .................. H04W 56/0015 |
| 2018/0192383 | A1* | 7/2018 | Nam ....................... H04J 11/00 |
| 2018/0198648 | A1 | 7/2018 | Sun et al. |
| 2018/0220462 | A1* | 8/2018 | Kusashima ....... H04W 74/0816 |
| 2019/0013985 | A1* | 1/2019 | Takeda .............. H04W 56/0015 |
| 2019/0053061 | A1* | 2/2019 | Sui ........................ H04L 5/0048 |
| 2019/0158170 | A1* | 5/2019 | Seo ...................... H04J 11/0023 |
| 2019/0229867 | A1* | 7/2019 | Yi .......................... H04L 5/0048 |
| 2019/0306847 | A1* | 10/2019 | Seo ........................ H04L 25/022 |
| 2019/0356524 | A1* | 11/2019 | Yi ........................... H04W 48/16 |

FOREIGN PATENT DOCUMENTS

| | | |
|---|---|---|
| CN | 104798329 A | 7/2015 |
| EP | 3032904 A1 | 6/2016 |
| JP | 2015530930 A | 10/2015 |
| JP | 2016502793 A | 1/2016 |
| JP | 2019537888 A | 12/2019 |
| WO | WO-2009046330 | 4/2009 |
| WO | WO-2009120828 A1 | 10/2009 |
| WO | WO-2011041544 A2 | 4/2011 |
| WO | WO-2013101757 | 7/2013 |
| WO | WO-2017039373 A1 | 3/2017 |
| WO | WO-2017083514 A1 | 5/2017 |

OTHER PUBLICATIONS

Huawei., et al., "Corrections on NPDCCH Scrambling in TS 36.211", 3GPP TSG-RAN WG1 Meeting #86, R1-167419, Gothenburg, Sweden, Aug. 22-27, 2016, 3 pages, URL: http://www.3gpp.org/ftp/tsg_ran/WG1_RL1/TSGR1_1422/Docs/R1-167419.zip, Aug. 27, 2016.

Taiwan Search Report—TW107100883—TIPO—dated Dec. 28, 2020.

International Search Report and Written Opinion—PCT/US2018/013179—ISA/EPO—dated Apr. 16, 2018.

* cited by examiner

SIGNAL SCRAMBLING SEQUENCE TECHNIQUES FOR WIRELESS COMMUNICATIONS

CROSS REFERENCES

The present Application for Patent is a continuation of U.S. patent application Ser. No. 15/865,738 by SUN, et al., entitled "SIGNAL SCRAMBLING SEQUENCE TECHNIQUES FOR WIRELESS COMMUNICATIONS" filed Jan. 9, 2018, which claims priority to U.S. Provisional Patent Application No. 62/445,127 by SUN, et al., entitled "SIGNAL SCRAMBLING SEQUENCE TECHNIQUES FOR WIRELESS COMMUNICATIONS," filed Jan. 11, 2017, assigned to the assignee hereof.

BACKGROUND

The following relates generally to wireless communication, and more specifically to signal scrambling sequence techniques for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, that may be otherwise known as user equipment (UE).

In a LTE or LTE-Advanced (LTE-A) network, a set of one or more base stations may define an eNodeB (eNB). In other examples (e.g., in a next generation new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink (DL) channels (e.g., for transmissions from a base station to a UE) and uplink (UL) channels (e.g., for transmissions from a UE to a base station).

A base station in some LTE or NR deployments may transmit downlink transmissions to one or more UEs, and the one or more UEs may transmit uplink transmissions back to the base station. In some cases, transmissions may be demodulated based on a scrambling sequence. For example, a control channel transmission may be demodulated based on a reference signal that is received from a same transmitter that transmits the control channel transmission. The reference signal may be scrambled, and the scrambling value for each frequency tone in the reference signal may be a function of a predetermined algorithm (e.g., based on an identification of the transmitter, an index value of the transmission, a channel center frequency, etc.). A receiver that receives the signal may descramble the signal, according to a determined scrambling sequence, and decode the signal. In cases where the signal is a reference signal, the reference signal may be used for demodulating other transmissions.

SUMMARY

The described techniques relate to improved methods, systems, devices, or apparatuses that support signal scrambling sequence techniques for wireless communications. Generally, the described techniques provide for identification of a scrambling sequence used for a reference signal, a control signal, or a data signal that is independent of a center frequency of a wireless system bandwidth. Such identification of scrambling sequences may allow for demodulation of signals in which a synchronization channel does not share a same center frequency as the wireless system bandwidth. In some examples, a synchronization channel may be identified that provides location information for a common control resource set. A scrambling sequence for one or more of a reference signal, a control signal, or a data signal, may be determined for use in demodulating the common control resource set, and one or more of the reference signal, the control signal, or the data signal, may be processed based at least in part on the scrambling sequence. In some cases, a cell ID and a slot or subframe index for the common control resource set may be determined, and the scrambling sequence identified for one or more of the reference signal, the control signal, or the data signal, based on the cell ID and slot or subframe index. In some cases, a number of different numerologies may be available in a wireless communications system, and the slot or subframe index may be based on a reference numerology of the number of available numerologies.

A method of wireless communication is described. The method may include identifying a synchronization channel containing location information for a common control resource set within a system bandwidth, determining a location of the common control resource set within the system bandwidth based at least in part on the location information, determining a scrambling sequence for one or more of a reference signal, a control signal, or a data signal, for use in demodulating the common control resource set, and processing one or more of the reference signal, the control signal, or the data signal, based at least in part on the scrambling sequence.

An apparatus for wireless communication is described. The apparatus may include means for identifying a synchronization channel containing location information for a common control resource set within a system bandwidth, means for determining a location of the common control resource set within the system bandwidth based at least in part on the location information, means for determining a scrambling sequence for one or more of a reference signal, a control signal, or a data signal, for use in demodulating the common control resource set, and means for processing one or more of the reference signal, the control signal, or the data signal, based at least in part on the scrambling sequence.

Another apparatus for wireless communication is described. The apparatus may include a processor, memory in electronic communication with the processor, and instructions stored in the memory. The instructions may be operable to cause the processor to identify a synchronization channel containing location information for a common control resource set within a system bandwidth, determine a location of the common control resource set within the system bandwidth based at least in part on the location information, determine a scrambling sequence for one or more of a reference signal, a control signal, or a data signal, for use in demodulating the common control resource set, and process one or more of the reference signal, the control signal, or the data signal, based at least in part on the scrambling sequence.

A non-transitory computer readable medium for wireless communication is described. The non-transitory computer-readable medium may include instructions operable to cause a processor to identify a synchronization channel containing location information for a common control resource set within a system bandwidth, determine a location of the common control resource set within the system bandwidth based at least in part on the location information, determine a scrambling sequence for one or more of a reference signal, a control signal, or a data signal, for use in demodulating the common control resource set, and process one or more of the reference signal, the control signal, or the data signal, based at least in part on the scrambling sequence.

Some examples of the method, apparatus, and non-transitory computer-readable medium described above may further include processes, features, means, or instructions for identifying a center frequency of the synchronization channel, and wherein the scrambling sequence for one or more of the reference signal, the control signal, or the data signal, may be determined based at least in part on the center frequency of the synchronization channel. In some examples of the method, apparatus, and non-transitory computer-readable medium described above, the center frequency of the synchronization channel may be different than a center frequency of the system bandwidth.

In some examples of the method, apparatus, and non-transitory computer-readable medium described above, the scrambling sequence for one or more of the reference signal, the control signal, or the data signal, may be determined independently of a center frequency of the synchronization channel or a center frequency of the system bandwidth. Some examples of the method, apparatus, and non-transitory computer-readable medium described above may further include processes, features, means, or instructions for determining a cell ID and a slot or subframe index for the common control resource set, and determining the scrambling sequence for one or more of the reference signal, the control signal, or the data signal, based on the cell ID and slot or subframe index. In some examples of the method, apparatus, and non-transitory computer-readable medium described above, the slot or subframe index may be based on a reference numerology of a plurality of available numerologies for wireless transmissions within the system bandwidth. In some examples of the method, apparatus, and non-transitory computer-readable medium described above, the reference numerology corresponds to a 15 kHz tone spacing or multiples thereof.

Some examples of the method, apparatus, and non-transitory computer-readable medium described above may further include processes, features, means, or instructions for identifying a raster of synchronization channel center frequencies within the system bandwidth. Some examples of the method, apparatus, and non-transitory computer-readable medium described above may further include processes, features, means, or instructions for identifying a center frequency of the synchronization channel as one of the synchronization channel center frequencies on the raster of synchronization channel center frequencies.

In some examples of the method, apparatus, and non-transitory computer-readable medium described above, the processing one or more of the reference signal, the control signal, or the data signal, comprises identifying a cell ID and a slot or subframe index associated with the common control resource set, identifying a center frequency of the synchronization channel, generating the scrambling sequence based at least in part on the cell ID, the slot or subframe index, and the center frequency of the synchronization channel, and applying the scrambling sequence to a signal pattern of one or more of the reference signal, the control signal, or the data signal.

In some examples of the method, apparatus, and non-transitory computer-readable medium described above, the processing one or more of the reference signal, the control signal, or the data signal, further comprises identifying a reference resource element (RE) associated with a received signal, and filling the scrambling sequence for REs of one or more of the reference signal, the control signal, or the data signal, REs starting at the reference RE based on the generated scrambling sequence. In some examples, identifying the reference RE may comprise identifying a constant fixed offset based at least in part on at least one of a physical broadcast channel (PBCH) or remaining minimum system information (RMSI).

Some examples of the method, apparatus, and non-transitory computer-readable medium described above may further include processes, features, means, or instructions for identifying that the common control resource set may be transmitted on a second carrier that may be different than a first carrier used to transmit the synchronization channel. Some examples of the method, apparatus, and non-transitory computer-readable medium described above may further include processes, features, means, or instructions for identifying a center frequency of a second synchronization channel transmitted on the second carrier. Some examples of the method, apparatus, and non-transitory computer-readable medium described above may further include processes, features, means, or instructions for determining the scrambling sequence for one or more of the reference signal, the control signal, or the data signal, for use in demodulating the common control resource set based on the center frequency of the second synchronization channel.

Some examples of the method, apparatus, and non-transitory computer-readable medium described above may further include processes, features, means, or instructions for identifying a cell ID and a slot or subframe index for the common control resource set, generating the scrambling sequence based at least in part on the cell ID, the slot or subframe index, and the reference RE location, and applying the scrambling sequence to reference signal REs starting at the reference RE location based on the generated scrambling sequence. In some examples, identifying the reference RE location may comprise identifying a constant fixed offset based at least in part on at least one of a PBCH or RMSI.

Some examples of the method, apparatus, and non-transitory computer-readable medium described above may further include processes, features, means, or instructions for identifying a raster of synchronization channel center frequencies within the system bandwidth, and identifying a first synchronization channel center frequency as the reference RE location within the system bandwidth. In some examples of the method, apparatus, and non-transitory computer-readable medium described above, the first synchronization channel center frequency may be selected based on an index of the raster of synchronization channel center frequencies and a parameter that identifies a scrambling sequence or a length of the scrambling sequence.

DETAILED DESCRIPTION

Improved methods, systems, devices, or apparatuses of various examples may be used to support sequence scrambling for reference, control, or data signals in a wireless communications system. Various described techniques provide for identification of a scrambling sequence used for a reference signal, a control signal, or a data signal that is independent of a center frequency of a wireless system bandwidth. Such identification of scrambling sequences may allow for demodulation of signals in which a synchronization channel does not share a same center frequency as the wireless system bandwidth. In some examples, a synchronization channel may be identified that provides location information for a common control resource set. A scrambling sequence for one or more of a reference signal, a control signal, or a data signal, may be determined for use in demodulating the common control resource set, and one or more of the reference signal, the control signal, or the data signal, may be processed based at least in part on the scrambling sequence. In some cases, a cell ID and a slot or subframe index for the common control resource set may be determined, and the scrambling sequence identified for one or more of the reference signal, the control signal, or the data signal, based on the cell ID and slot or subframe index. In some cases, a number of different numerologies may be available in a wireless communications system, and the slot or subframe index may be based on a reference numerology of the number of available numerologies.

Such techniques may provide for relatively efficient and flexible usage of wireless resources, and may help to enhance the efficiency of a wireless network. The present disclosure describes various techniques with reference to next generation networks (e.g., 5G or NR networks) that are being designed to support features such as high bandwidth operations, more dynamic subframe/slot types, and self-contained subframe/slot types (in which HARQ feedback for a subframe/slot may be transmitted before the end of the subframe/slot). However, such techniques may be used for any system in which uplink or downlink transmissions may be transmitted using scrambling sequences.

Aspects of the disclosure are initially described in the context of a wireless communications system. Aspects of the disclosure are further illustrated by and described with reference to apparatus diagrams, system diagrams, and flowcharts that relate to signal scrambling sequence techniques for wireless communications.

Figure 1:
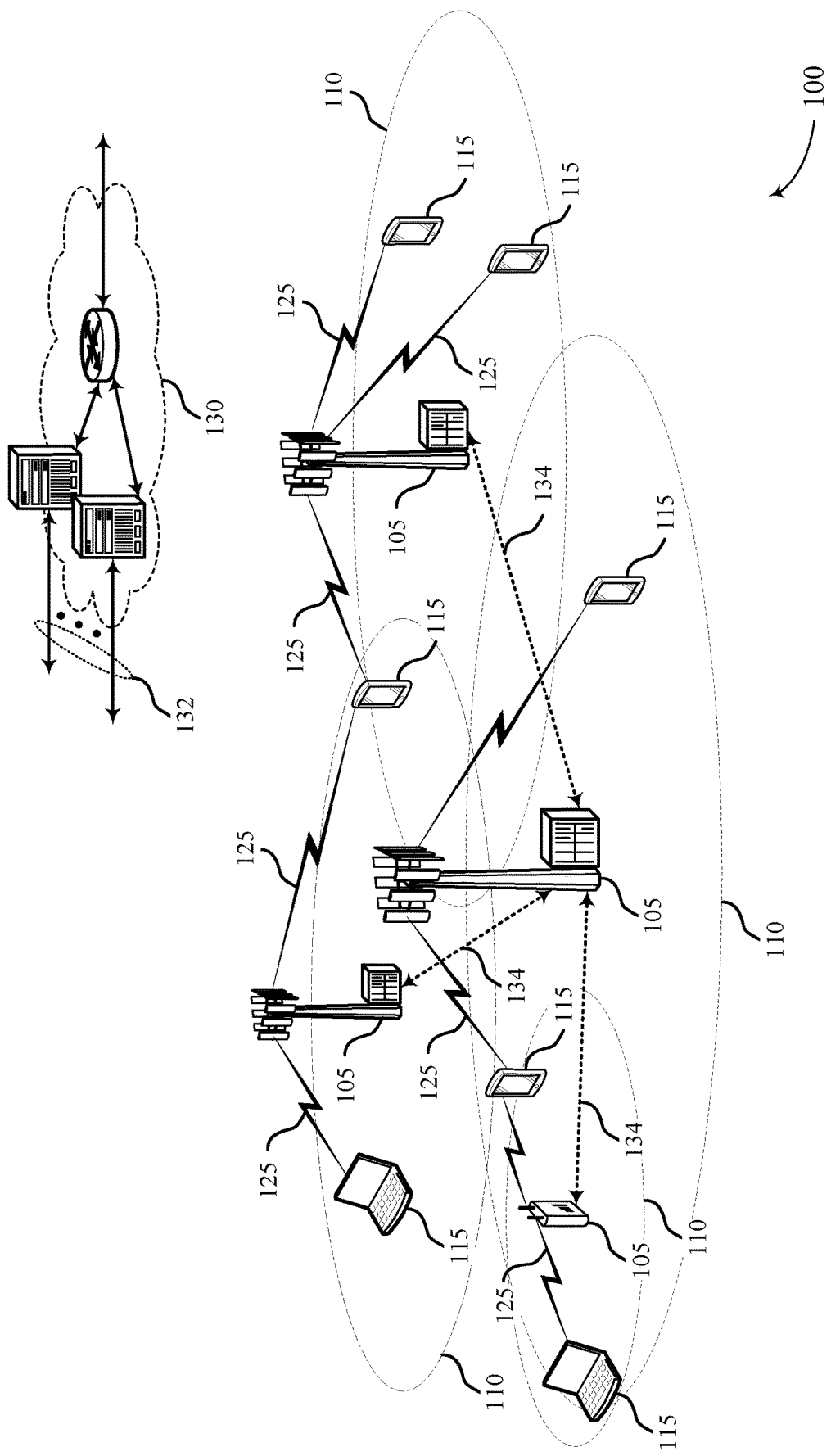
FIG. 1 illustrates an example of a system for wireless communication that supports signal scrambling sequence techniques for wireless communications in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. In some cases, base stations 105 and UEs 115 may communicate using scrambling sequences that may be determined independently of a system bandwidth and/or a system bandwidth center frequency.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one MME, at least one S-GW, and at least one P-GW. The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, Internet Protocol (IP) connectivity, and other access, routing, or mobility functions. At least some of the network devices, such as a base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming).

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 OFDM symbol periods (depending on the length of the cyclic prefix (CP) prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

In some NR deployments, multiple different numerologies may be available, in which tone spacing for subcarriers may be increased or decreased, with a corresponding decrease or increase in OFDM symbol periods. For example, a 15 kHz tone spacing of legacy LTE may be used to provide a slot with 7 OFDM symbol periods (for normal CP) with a slot duration of 0.5 ms, and thus would provide a radio frame with 20 slots across 10 subframes of a legacy 10 ms radio frame. Another numerology may provide a 30 kHz tone spacing, which may reduce OFDM symbol duration by half relative to cases that have 15 kHz tone spacing, and would provide a radio frame with 40 slots across a 10 ms time duration corresponding to a legacy LTE frame. Further numerologies may also be available in NR systems, such as a 60 kHz tone spacing numerology having 80 slots across a 10 ms time duration, a 120 kHz tone spacing numerology having 160 slots across a 10 ms time duration, etc. In some cases, a slot index may be used to identify a slot within a radio frame, and different numerologies may have different numbers of slots, and thus different slot indices, within a radio frame.

For a 15 kHz tone spacing numerology, a resource element may consist of one symbol period and one subcarrier (e.g., a 15 kHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Other numerologies may scale according to the tone spacing of subcarriers. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different numerology, or symbol duration, than other CCs, which may include use of a reduced symbol duration as compared with symbol durations of the other CCs. A shorter symbol duration may be associated with increased subcarrier spacing, as discussed above, for different numerologies. A TTI in an eCC may consist of one or multiple symbols. In some cases, the TTI duration (that is, the number of symbols in a TTI) may be variable. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some cases, scrambling sequences may be used for different signals that are transmitted between base stations 105 and UEs. Various described techniques provide for identification of a scrambling sequence used for a reference signal, a control signal, or a data signal that is independent of a center frequency of a wireless communications system 100 bandwidth. Such identification of scrambling sequences may allow for demodulation of signals in which a synchronization channel does not share a same center frequency as the wireless system bandwidth.

Figure 2:
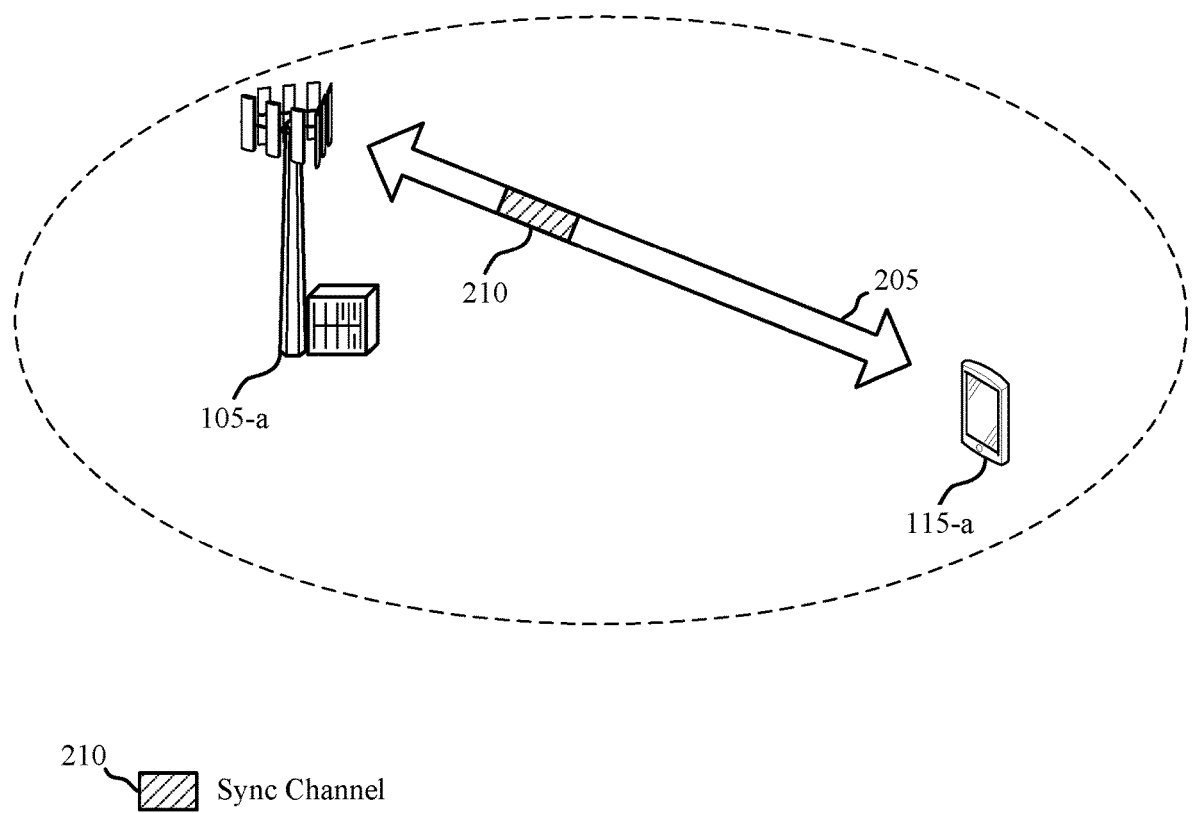
FIG. 2 illustrates an example of a wireless communications system that supports signal scrambling sequence techniques for wireless communications in accordance with aspects of the present disclosure.

FIG. 2 illustrates an example of a wireless communications system 200 for signal scrambling sequence techniques for wireless communications. Wireless communications system 200 includes base station 105-a and a UE 115-a, that may be examples of aspects of a base station 105 or UE 115 as described above with reference to FIG. 1. In the example of FIG. 2, the wireless communications system 200 may operate according to a radio access technology (RAT) such as a 5G or NR RAT, although techniques described herein may be applied to any RAT and to systems that may concurrently use two or more different RATs.

Base station 105-a may communicate with UE 115-a, and may receive uplink transmissions from the UE 115-a and transmit downlink transmissions to the UE 115-a over carrier 205. In some examples, base station 105-a may allocate resources for communication with UEs over carrier 205, and in some cases may configure a synchronization channel 210 that may be monitored by the UE 115-a. In some cases, a center frequency of the synchronization channel 210 may be different than a center frequency of the system bandwidth used for communications between the UE 115-a and the base station 105-a. The synchronization channel may include information that UE 115-a may use to locate common control information, in some examples.

In some systems, control information, such as common control information, UE-specific control information, or combinations thereof, may be transmitted in a physical downlink control channel (PDCCH) transmission. UE 115-a may use a reference signal transmission from the base station 105-a, such as a cell-specific reference signal (CRS) to perform channel estimation, which may be used for demodulation of the PDCCH transmission. The reference signal transmission may be scrambled, and the scrambling value for each tone of the reference signal may be, in some cases, a function of cell ID, a subframe or slot index, and a center frequency of the channel. Scrambling sequences for such signals may be designed to be not a function of system bandwidth. In some systems, such as an NR or 5G system, different reference signals may be used for PDCCH demodulation, such as a demodulation reference signal (DMRS), for demodulation of common control information, UE-specific control information, or combinations thereof. In such cases, scrambling sequences for the different reference signals may be defined to allow UE 115-a to perform channel estimation using the reference signal. Additionally, various other parameters that may be used for scrambling sequence determination (e.g., cell ID, subframe or slot index, center frequency, etc.) may be identified for NR systems that may have different numerologies and therefore different subframe or slot indexes, synchronization channels that are not centered on a system bandwidth, or other variable parameters.

Furthermore, in some NR systems, common control information may be transmitted in control resource sets (subbands) that may not occupy a full wideband signal. In some cases, the synchronization channel 210 may contain information to point the UE 115-a to the common control resource set, and the UE 115-a can be redirected to a UE-specific control resource set after receiving the common control resource set. As indicated above, in some cases the synchronization channel 210 also may have a different center frequency than a center frequency of the system bandwidth. The common control resource set may also be configured to different locations within the system bandwidth as well, which may not necessarily be centered in the system bandwidth. Various techniques provided herein may be used by UE 115-a to decode, for example, a PDCCH in a common control resource set, by providing scrambling sequences for signals that are used for channel estimation and demodulation.

Figure 3:
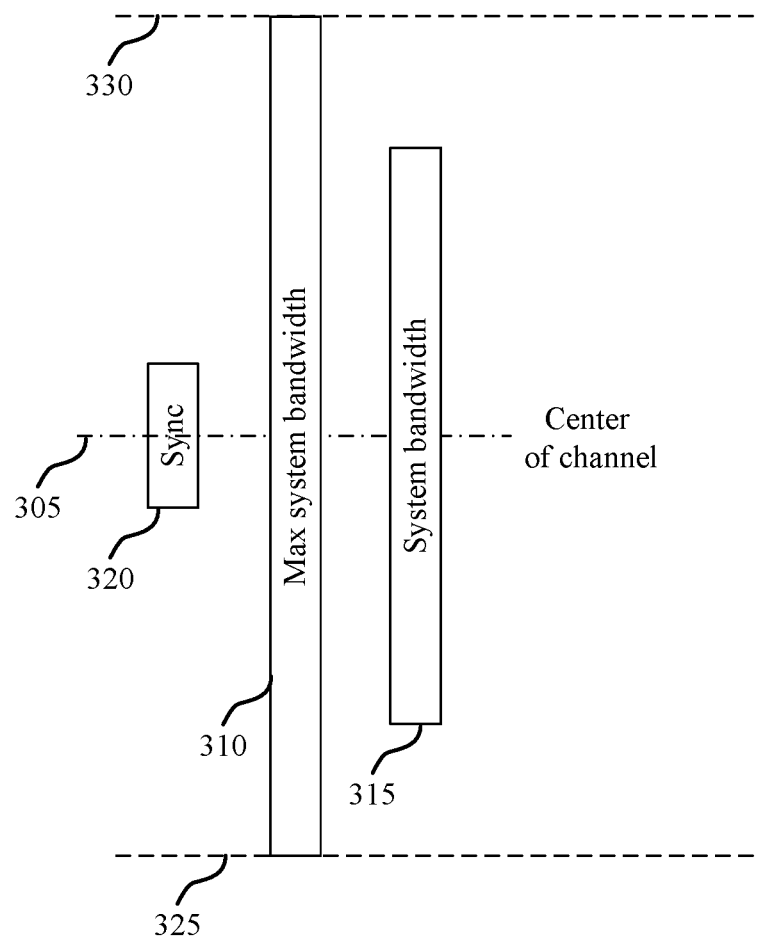
FIG. 3 illustrates an example of wireless resources for a synchronization channel relative to a system bandwidth, in accordance with aspects of the present disclosure.

FIG. 3 illustrates an example of wireless resources 300 for a synchronization channel relative to a system bandwidth, in accordance with aspects of the present disclosure. The wireless resources 300 may be used, for example, in communications between a UE and a base station such as discussed above with respect to FIGS. 1 and 2.

In this example, center frequency 305 of a maximum system bandwidth 310 may also be the center frequency of a system bandwidth 315 being used for current transmissions and for a synchronization channel 320. The synchronization channel 320 may contain synchronization signals, such as a primary synchronization signal (PSS) and a secondary synchronization signal (SSS), which may enable synchronization on a subframe level and allow for identification of a physical layer identity and cell ID, which may be used to identify a location of one or more reference signals for channel estimation. As the synchronization signal is centered in the system bandwidth 315, a UE that identifies the synchronization signal may effectively identify the center of the channel as center frequency 305, according to techniques such as used in legacy LTE systems. In cases where such a configuration is used in NR systems, a base station may indicate that legacy LTE synchronization sequences may be used. In such cases, the scrambling of a signal, such as a reference signal for use in decoding a control channel transmissions, may be defined for the maximum system bandwidth. The lower end 325 of the maximum system bandwidth 310 may be identified from the center frequency 305 of the channel and may be used as a reference resource element (RE) for generating a scrambling sequence. A random number generator may be initiated with a seed as a function of the cell ID and subframe index to generate a series of pseudo-random numbers that may be sequentially filled for the scrambled signal REs, starting from the reference RE in the upwards direction to the upper end 330 of the maximum system bandwidth 310, with only the REs within the system bandwidth 315 being used. While the center frequency 305 of FIG. 3 is common across the synchronization channel 320, maximum system bandwidth 310, and system bandwidth 315, other examples may not have such a common center frequency.

Figure 4:
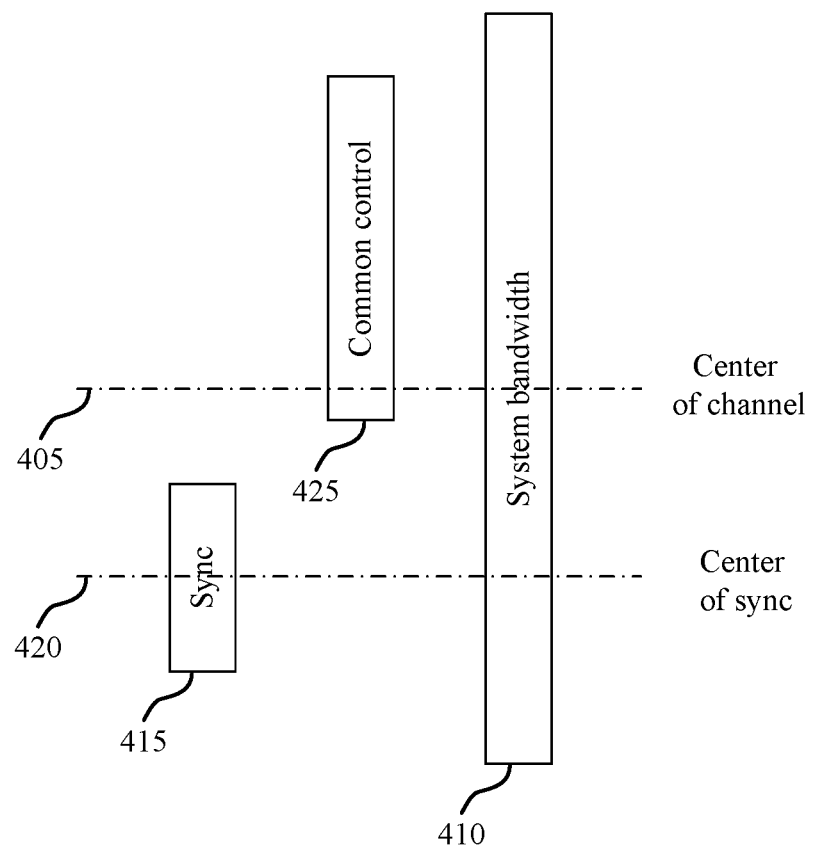
FIG. 4 illustrates an example of wireless resources for a synchronization channel and for common control information, that support signal scrambling sequence techniques for wireless communications in accordance with aspects of the present disclosure.

FIG. 4 illustrates another example of wireless resources 400 for signal scrambling sequence techniques for wireless communications, in accordance with aspects of the present disclosure. The wireless resources 400 may be used, for example, in communications between a UE and a base station such as discussed above with respect to FIGS. 1 and 2.

In this example, center frequency 405 of a maximum system bandwidth 410 may be different than a synchronization center frequency 420 of a synchronization channel 415. Furthermore, a set of common control resources 425 may be offset from the synchronization channel 415. In such cases, a receiver, such as a UE, may not be able to identify system bandwidth information and center frequency information from the synchronization channel 415. In some examples, the synchronization channel 415 may include an indication of a location of the common control resources 425, and when a receiver picks up synchronization channel 415, it may identify a location of the common control resources 425. In such cases, the receiver may still be unaware of a relative location of the synchronization channel 415 and common control resources 425 within the system bandwidth 410.

In some examples, scrambling sequences for a signal that may be used to demodulate the common control resources 425 may be defined such that the scrambling sequence is independent from the center frequency 405 of the system bandwidth 410. In some examples, such a scrambling sequence for a signal (e.g., a DMRS), may be defined to depend on the synchronization center frequency 420 of the synchronization channel 415, but not depending on the channel center frequency 405. In such cases, after a UE has identified the synchronization channel 415, and knows the synchronization center frequency 420, it may determine the scrambling sequence for the signal to be used to demodulate the common control resources 425 (e.g., a scrambling sequence for a DMRS).

In other examples, a scrambling sequence for a signal (e.g., a DMRS), may be defined to be independent from synchronization center frequency 420 as well. In such cases, a receiver, such as a UE, may identify the scrambling sequence for tones within the common control resources 425, only as a function of cell ID and slot index. In some examples, the slot index may be linked to a specific reference numerology due to multiple numerologies supported in NR as discussed above. Such a reference numerology may correspond to a 15 kHz tone spacing, or multiples thereof, in some examples. In such a manner, when the receiver knows where the set of common control resources 425 is, it may identify how to descramble the resources before decoding, for example, a minimum system information block (MSIB) from a transmitter such as a base station. While various examples are described herein with reference to a DMRS scrambling sequence that may be used to demodulate common control information, such scrambling sequence techniques may be used for any reference signals, control signals, or data signals that may have scrambling sequences applied thereto.

As indicated above, in some examples a scrambling sequence may be identified based on synchronization center frequency 420. In some cases, the synchronization center frequency 420 may be identified as one point on a raster of potential synchronization center frequencies. Thus a receiver, such as a UE, after identifying the synchronization channel 415 may identify the associated point on the raster as the synchronization center frequency 420, which may be different from the channel center frequency 405. The scrambling sequence for a reference signal (e.g., a DMRS) for PDCCH demodulation may be defined with respect to the synchronization center frequency 420. In such cases, a random number generator may be initiated with a seed as a function of the cell ID and subframe index that are determined from the synchronization channel 415. A RE associated with the synchronization center frequency 420 may be defined as the reference RE, which may be a RE that contains the synchronization center frequency 420 or a RE with a known constant offset from the synchronization center frequency 420. For example, in some cases, the known constant offset may be an offset from the edge of synchronization channel 415 or the synchronization center frequency 420. In some examples, the known constant offset may be an offset from the edge of common control resources 425, center frequency 405, or the center of common control resources 425. The known constant offset may be received in some additional signaling (e.g., synchronization channel 415 or common control resources 425). For example, the known constant offset may be determined based on a PBCH, or a RMSI. The random number generator may be used to generate a sequence of pseudo-random numbers that may be sequentially filled in the reference signal REs starting from the reference RE in an upward direction. In some cases, the generated sequence may wrap around at another fixed known offset in cases where reference signal REs may be located at frequencies below that of the reference RE. Such a wrap around may not be necessary in cases where the reference RE is defined to be low enough that there will not be any reference signal REs at lower frequencies in the same channel. In some examples, the scrambling sequence may start from the synchronization center frequency 420 reference RE and reference signal REs may be filled in both upwards and downwards directions, instead of upwards only.

In some cases, multiple component carriers may be present in a system, and a receiver, such as a UE, may need to identify a synchronization channel center frequency for different carriers in order to descramble a reference signal of the other carrier. In some examples, a receiver may be signaled to monitor a control resource set of another carrier, and may be provided with the center of the synchronization channel of the other carrier, which may allow for generation of the scrambling sequence at the other carrier. In other examples, multiple synchronization signals may be transmitted at different points on the synchronization raster. In such cases, a synchronization signal transmitter, such as a base station, may provide a common control resource set pointed from respective synchronization signals and the scrambling sequence may be determined as discussed above. For other control resource sets, a transmitter may provide an indication of a particular synchronization signal to use in order to generate a scrambling sequence, or may indicate that a different scrambling sequence generation may be used for such other control resource sets.

Figure 5:
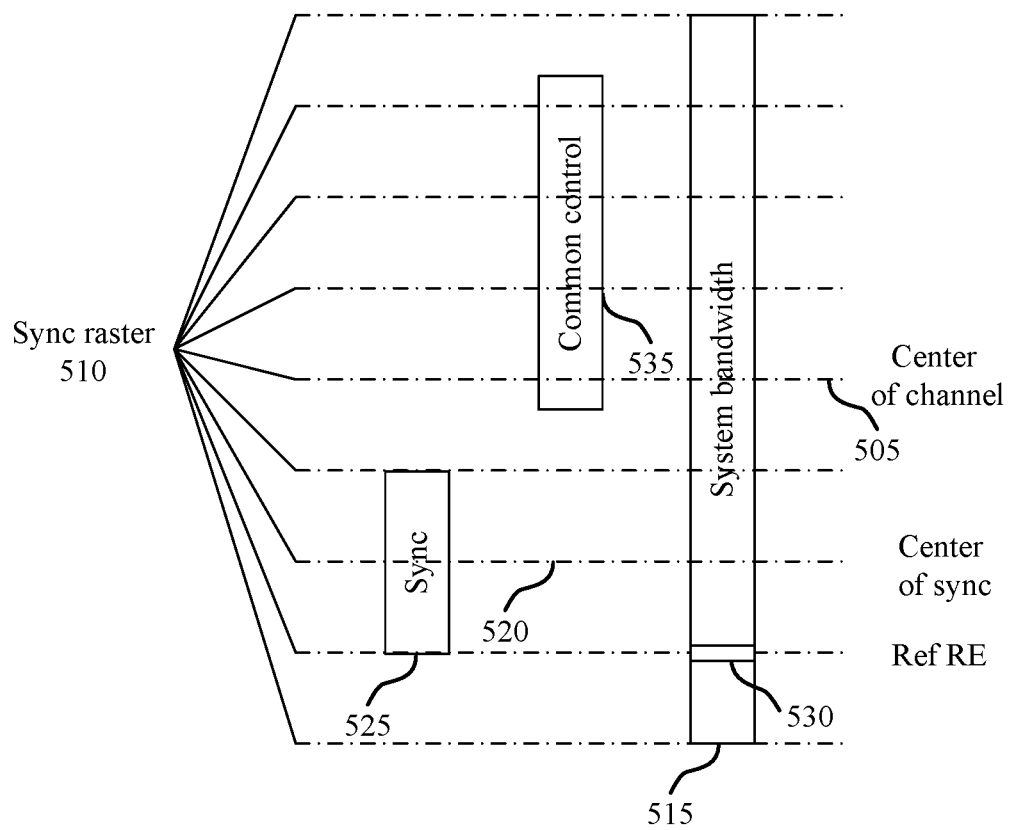
FIG. 5 illustrates an example of wireless resources for a synchronization channel and for common control information, that support signal scrambling sequence techniques for wireless communications in accordance with aspects of the present disclosure.

FIG. 5 illustrates another example of wireless resources 500 for signal scrambling sequence techniques for wireless communications. The wireless resources 500 may be used, for example, in communications between a UE and a base station such as discussed above with respect to FIGS. 1 and 2.

In this example, center frequency 505 of a maximum system bandwidth 515 may be different than a synchronization center frequency 520 of a synchronization channel 525. The synchronization center frequency 520 may be one point of a synchronization raster 510 that may provide a number of available synchronization center frequencies. In this example, a reference RE 530 may be defined. Furthermore, a set of common control resources 535 may be offset from the synchronization channel 525. Similarly as discussed above, a receiver, such as a UE, may not be able to identify system bandwidth information and center frequency information from the synchronization channel 525. In some examples, the synchronization channel 525 may include an indication of a location of the common control resources 535, and when a receiver picks up synchronization channel 525, it may identify a location of the common control resources 535. In such cases, the receiver may still be unaware of a relative location of the synchronization channel 525 and common control resources 535 within the system bandwidth 515.

In this example, the synchronization channel 525 may be centered on one of the points on the synchronization raster 510. After a receiver identifies the synchronization channel 525, it may identify the synchronization center frequency 520, which may be different than the channel center frequency 505. In the example of FIG. 5, a scrambling sequence for a reference signal (e.g., DMRS) for control channel demodulation may be defined with respect to an absolute reference RE 530. In such cases, the random number generator may be initiated with a seed as a function of the cell ID and subframe index, identified from the synchronization channel 525, and the random numbers generated and sequentially filled in the reference signal REs starting from the reference RE 530 in upward direction. In some cases, only reference signal REs within the system bandwidth 515 are used for generating the scrambling sequence.

In some cases, the reference RE 530 may be defined as a point in the synchronization raster 510 index. In some cases, the reference RE 530 may be defined such that it is relatively close to the set of common control resources 535, which may provide relatively shorter scrambling sequences to reach and cover the common control resources 535, and may help to reduce the number of times the random number generator is to be clocked. For example, it the reference RE 530 is at f0 and the carrier for the set of common control resources 535 is centered at f1, and f0 and f1 are relatively far apart, then the random number generator may need to be clocked a number of times in which the output is unused.

As indicated above, the seed for a random number generator that generates the scrambling sequence may be a function of cell ID and slot index (time). In cases where a number of different numerologies may be available, such as different available numerologies in NR, a numerology index may be included in the function to determine the random seed. Furthermore, if extended CP (ECP) is supported in addition to normal CP (NCP), an NCP or ECP flag may be used in the function to generate the seed as well.

Figure 6:
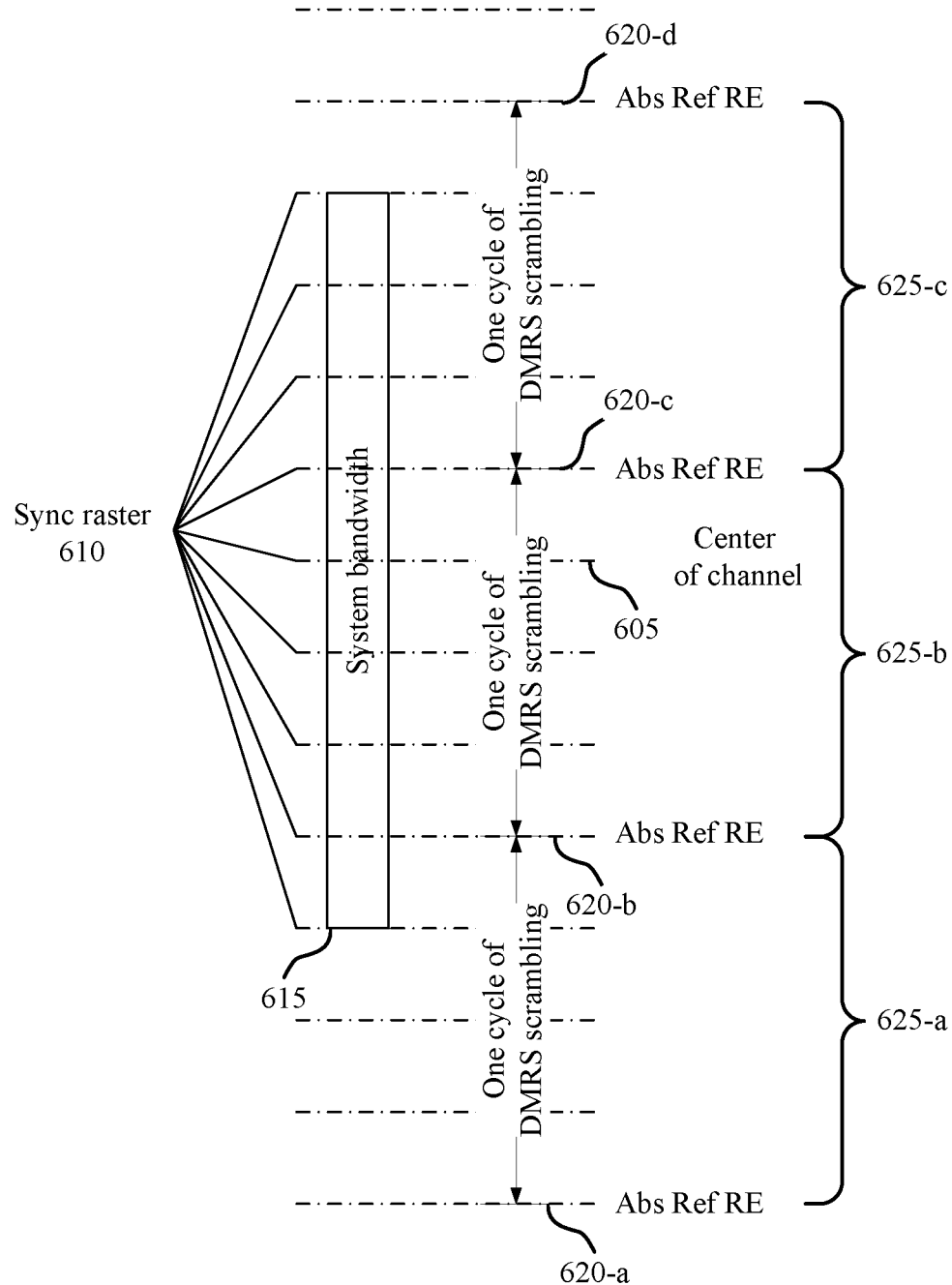
FIG. 6 illustrates an example of a scrambling sequence cycles for wireless communications in accordance with aspects of the present disclosure.

FIG. 6 illustrates another example of wireless resources 600 for signal scrambling sequence techniques for wireless communications, in accordance with various aspects of the present disclosure. The wireless resources 600 may be used, for example, in communications between a UE and a base station such as discussed above with respect to FIGS. 1 and 2.

In this example, center frequency 605 of a system bandwidth 615 may once again be different than a synchronization center frequency of a synchronization channel. The synchronization center frequency may be one point of a synchronization raster 610 that may provide a number of available synchronization center frequencies. In this example, a number of different available reference REs 620 may be defined that may be used to provide a number of cycles 625 of reference signal scrambling sequences.

In the example of FIG. 6, when the synchronization raster 610 is defined, a number of reference RE 620 reference points may be established. Each point in the synchronization raster 610 may have a raster frequency index (like a channel index) s. In some examples, a reference RE 620 may be identified as a tone corresponding to the synchronization raster frequency with s mod X=0, in which X is a specified integer parameter, X≥1. Alternatively, one or more of the reference REs 620 may be defined as a fixed offset from the synchronization raster frequency with s mod X=0. For example, the fixed offset may be a known constant offset, and may be an offset from a synchronization signal corresponding to synchronization raster 610, or from a common control signal. The known constant offset may be received in some additional signaling (e.g., the synchronization signal or the common control signal). For example, the known constant offset may be determined based on a physical broadcast channel (PBCH), or remaining minimum system information (RMSI). The random number generator that generates the scrambling sequence may start from the corresponding reference RE 620 and fill the reference signal REs in a upward direction. The sequence generator may be reset to the initial seed when reaching the next reference RE 620, and thus the scrambling sequence for the reference signal transmission may have a periodic structure with a number of cycles 625 of scrambling sequences.

The selection of X in such examples will determine a length of the period of each cycle 625 of scrambling sequences. In some cases, the length of the period may be selected to be long enough to provide relatively small impact on a peak to average power ratio (PAPR) of the reference signal and yet be short enough to provide a relatively short scrambling sequence which may provide some memory and processing resources savings. In some cases, if the reference signal is to be transmitted in a downlink transmission from a base station, the PAPR may not be as critical than if the reference signal is transmitted in an uplink transmission from a UE. Thus, in some cases, the value of X may be selected based on a transmitter that is to transmit the scrambled reference signal, control signal, or data signal. In one example, the spacing of points in the synchronization raster 610 may be 1.8 MHz, and the value of X may be set at X=10, which may provide that there is not a repetition in the scrambling sequence if the system bandwidth is within 18 MHz. In another example, the spacing of points in the synchronization raster 610 may be 1.8 MHz, and the value of X may be set at X=2, which provides that there will be five repetitions in a system bandwidth of 18 MHz. Such a periodic sequence design may be used in cases where there are multiple synchronization signals on different synchronization raster points. In some cases, a UE may be signaled to monitor a control resource set of another carrier, and would not need to know the synchronization signal center frequency of the other carrier.

Figure 7:
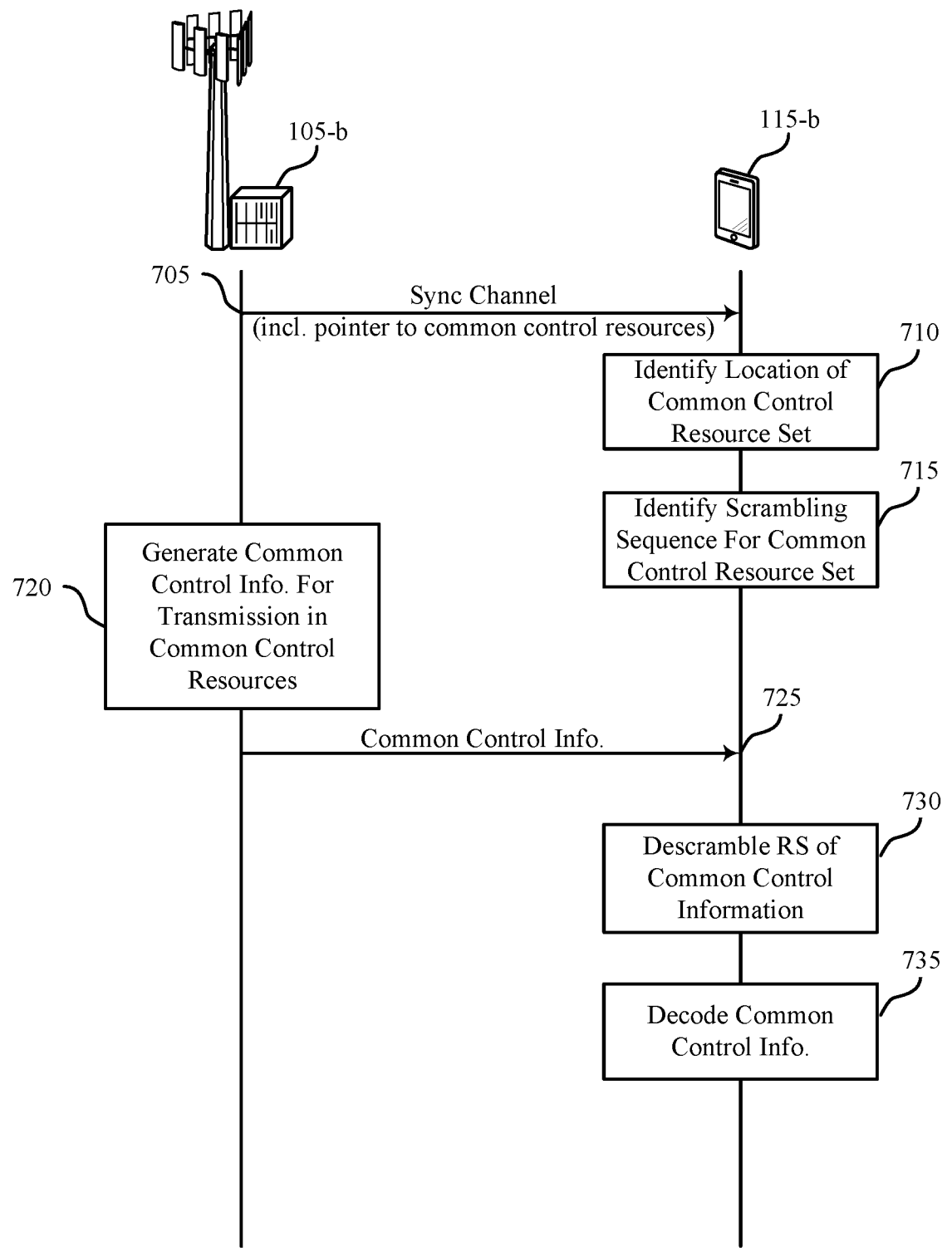
FIG. 7 illustrates an example of a process flow that supports signal scrambling sequence techniques for wireless communications in accordance with aspects of the present disclosure.

FIG. 7 illustrates an example of a process flow 700 for signal scrambling sequence techniques for wireless communications, in accordance with various aspects of the present disclosure. Process flow 700 may include a base station 105-b and a UE 115-b, that may be examples of the corresponding devices described with reference to FIGS. 1 and 2.

Base station 105-b may transmit a synchronization channel 705 to the UE 115-b. The synchronization channel may include, for example, PSS and SSS transmissions, as well as an indication of a location of a common control resource set within a system bandwidth. In some cases, the common control resource set may be offset from the synchronization channel. In some cases, a center frequency of the synchronization channel may be different than a center frequency of the system bandwidth for communications between the base station 105-b and UE 115-b.

At block 710, the UE 115-b may identify a location on the common control resource set. The location on the common control resource set may be identified, for example, by a pointer contained in the synchronization channel that may indicate the location of the common control resource set. In some cases, such a pointer may provide a relative location of the common control resource set that is relative to a center frequency of the synchronization channel. In some cases, such a pointer may have a value that is mapped to a particular offset, for example.

At block 715, the UE 115-b may identify a scrambling sequence for the common control resource set. In some cases, the scrambling sequence may be used to scramble a reference signal, and the reference signal may be used for channel estimation to demodulate the information in the common control resource set, such as PDCCH transmissions contained in the common control resource set. The scrambling sequence may be identified based at least in part on the center frequency of the synchronization channel, in some examples such as discussed above with reference to FIG. 4. In some examples, the scrambling sequence may be identified independently of a center frequency of the synchronization channel or a center frequency of the system bandwidth, such as discussed above with reference to FIGS. 5 and 6.

At block 720, the base station 105-b may generate common control information for transmission in the common control resources. The common control information may include, for example, random access information and system parameters that may be used to establish a connection between the base station 105-b and UE 115-b. The common control information may be formatted into the set of common control resources that are indicated in the synchronization channel, and transmitted in downlink transmission 725 to the UE 115-b.

The UE 115-b may, at block 730, descramble a reference signal of the common control information. The UE 115-b may descramble the reference signal according to the identified scrambling sequence for the reference signal. A channel estimation may be performed based on the descrambled reference signal, which may be used to demodulate and decode the common control information, as indicated at block 735.

Figure 8:
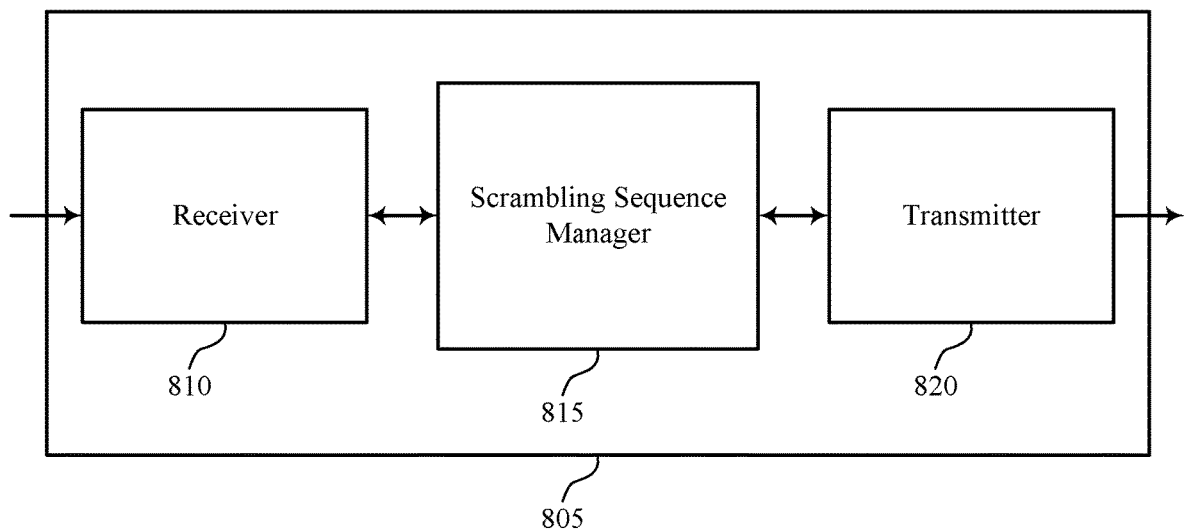
FIGS. 8 through 10 show block diagrams of a device that supports signal scrambling sequence techniques for wireless communications in accordance with aspects of the present disclosure.

FIG. 8 shows a block diagram 800 of a wireless device 805 that supports signal scrambling sequence techniques for wireless communications in accordance with various aspects of the present disclosure. Wireless device 805 may be an example of aspects of a user equipment (UE) 115 or base station 105 as described with reference to FIG. 1. Wireless device 805 may include receiver 810, scrambling sequence manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to signal scrambling sequence techniques for wireless communications, etc.). Information may be passed on to other components of the device. The receiver 810 may be an example of aspects of the transceiver 1135 described with reference to FIG. 11.

Scrambling sequence manager 815 may be an example of aspects of the scrambling sequence manager 1115 described with reference to FIG. 11.

Scrambling sequence manager 815 and/or at least some of its various sub-components may be implemented in hardware, software executed by a processor, firmware, or any combination thereof. If implemented in software executed by a processor, the functions of the scrambling sequence manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The scrambling sequence manager 815 and/or at least some of its various sub-components may be physically located at various positions, including being distributed such that portions of functions are implemented at different physical locations by one or more physical devices. In some examples, scrambling sequence manager 815 and/or at least some of its various sub-components may be a separate and distinct component in accordance with various aspects of the present disclosure. In other examples, scrambling sequence manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Scrambling sequence manager 815 may identify a synchronization channel containing location information for a common control resource set within a system bandwidth, determine a location of the common control resource set within the system bandwidth based on the location information, determine a scrambling sequence for one or more of a reference signal, a control signal, or a data signal, for use in demodulating the common control resource set, and process one or more of the reference signal, the control signal, or the data signal, based on the scrambling sequence.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
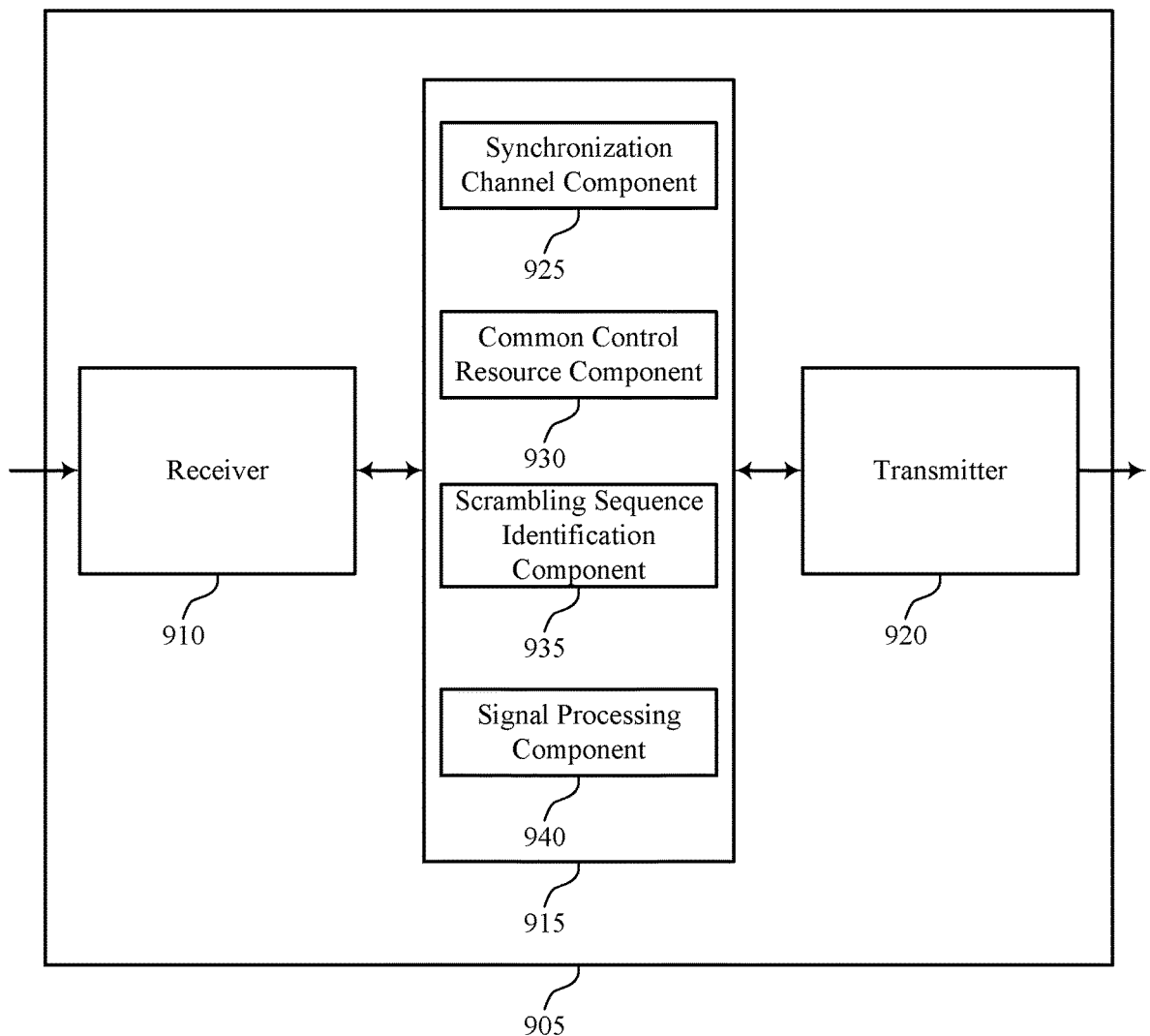

FIG. 9 shows a block diagram 900 of a wireless device 905 that supports signal scrambling sequence techniques for wireless communications in accordance with various aspects of the present disclosure. Wireless device 905 may be an example of aspects of a wireless device 805 or a UE 115 or base station 105 as described with reference to FIGS. 1 and 8. Wireless device 905 may include receiver 910, scrambling sequence manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to signal scrambling sequence techniques for wireless communications, etc.). Information may be passed on to other components of the device. The receiver 910 may be an example of aspects of the transceiver 1135 described with reference to FIG. 11.

Scrambling sequence manager 915 may be an example of aspects of the scrambling sequence manager 1115 described with reference to FIG. 11. Scrambling sequence manager 915 may also include synchronization channel component 925, common control resource component 930, scrambling sequence identification component 935, and signal processing component 940.

Synchronization channel component 925 may identify a synchronization channel containing location information for a common control resource set within a system bandwidth. In some cases, the center frequency of the synchronization channel is different than a center frequency of the system bandwidth.

Common control resource component 930 may determine a location of the common control resource set within the system bandwidth based on the location information. In some cases, the common control resource set may be transmitted on a second component carrier that is different than a first component carrier used to transmit the synchronization channel.

Scrambling sequence identification component 935 may determine a scrambling sequence for one or more of a reference signal, a control signal, or a data signal, for use in demodulating the common control resource set. In some cases, scrambling sequence identification component 935 may determine the scrambling sequence for one or more of the reference signal, the control signal, or the data signal, based on a cell ID and slot or subframe index of the signal. In some cases, scrambling sequence identification component 935 may identify a center frequency of the synchronization channel, and the scrambling sequence for one or more of the reference signal, the control signal, or the data signal, may be determined based on the center frequency of the synchronization channel. In some cases, scrambling sequence identification component 935 may identify a center frequency of a second synchronization channel transmitted on the second component carrier, and determine the scrambling sequence for one or more of the reference signal, the control signal, or the data signal, for use in demodulating the common control resource set based on the center frequency of the second synchronization channel.

In some cases, scrambling sequence identification component 935 may identify a reference RE location within the system bandwidth, and generate the scrambling sequence based on the cell ID, the slot or subframe index, and the reference RE location. In some examples, identifying the reference RE location may comprise identifying a constant fixed offset based at least in part on at least one of a physical broadcast channel (PBCH) or remaining minimum system information (RMSI). In some cases, the scrambling sequence for one or more of the reference signal, the control signal, or the data signal, is determined independently of a center frequency of the synchronization channel or a center frequency of the system bandwidth. In some cases, the processing one or more of the reference signal, the control signal, or the data signal, includes identifying a cell ID and a slot or subframe index associated with the common control resource set, identifying a center frequency of the synchronization channel, generating the scrambling sequence based on the cell ID, the slot or subframe index, and the center frequency of the synchronization channel, and applying the scrambling sequence to a signal pattern of one or more of the reference signal, the control signal, or the data signal. In some cases, the processing one or more of the reference signal, the control signal, or the data signal, further includes identifying a reference RE associated with a received signal, and filling the scrambling sequence for REs of one or more of the reference signal, the control signal, or the data signal, REs starting at the reference RE based on the generated scrambling sequence. In some examples, identifying the reference RE may comprise identifying a constant fixed offset based at least in part on at least one of a PBCH or RMSI.

Signal processing component 940 may apply the scrambling sequence to a reference signal REs starting at the reference RE location based on the generated scrambling sequence and process one or more of the reference signal, the control signal, or the data signal, based on the scrambling sequence.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
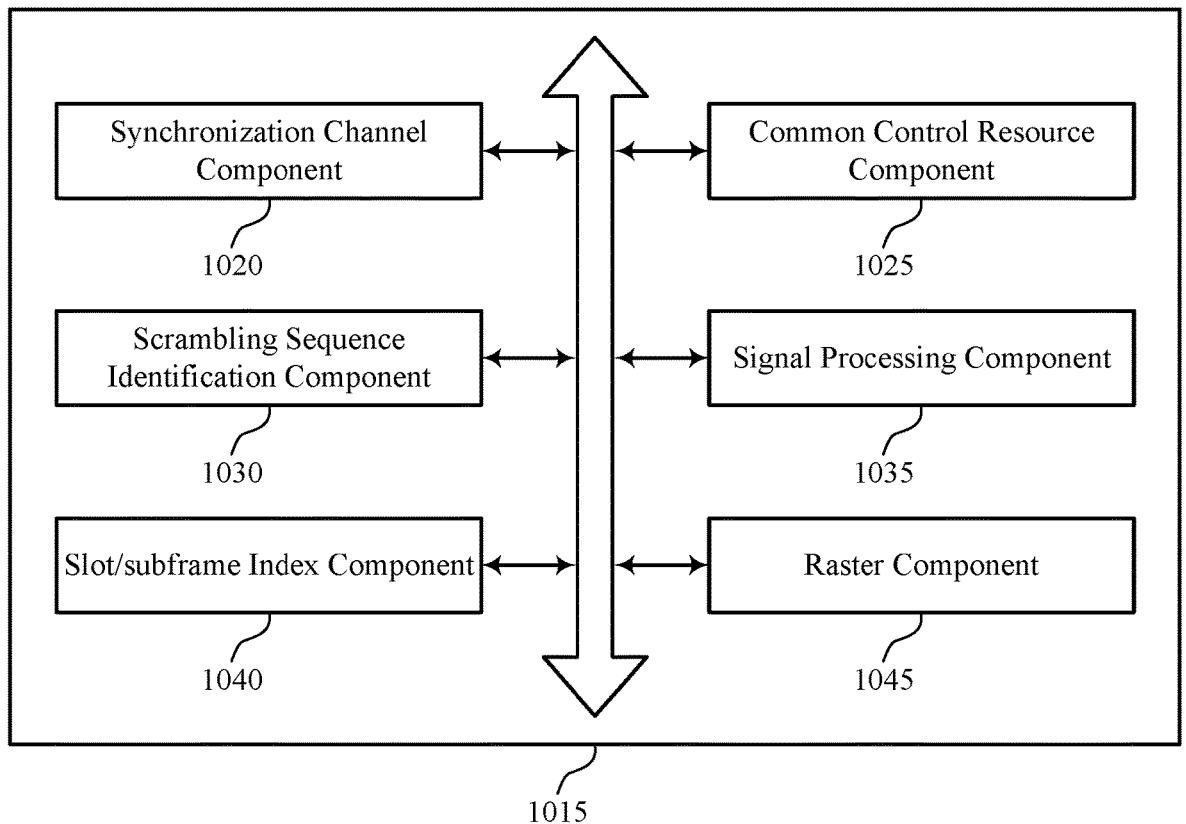

FIG. 10 shows a block diagram 1000 of a scrambling sequence manager 1015 that supports signal scrambling sequence techniques for wireless communications in accordance with various aspects of the present disclosure. The scrambling sequence manager 1015 may be an example of aspects of a scrambling sequence manager 815, a scrambling sequence manager 915, or a scrambling sequence manager 1115 described with reference to FIGS. 8, 9, and 11. The scrambling sequence manager 1015 may include synchronization channel component 1020, common control resource component 1025, scrambling sequence identification component 1030, signal processing component 1035, slot/subframe index component 1040, and raster component 1045. Each of these modules may communicate, directly or indirectly, with one another (e.g., via one or more buses).

Synchronization channel component 1020 may identify a synchronization channel containing location information for a common control resource set within a system bandwidth. In some cases, the center frequency of the synchronization channel is different than a center frequency of the system bandwidth.

Common control resource component 1025 may determine a location of the common control resource set within the system bandwidth based on the location information and identify that the common control resource set is transmitted on a second carrier that is different than a first carrier used to transmit the synchronization channel.

Scrambling sequence identification component 1030 may determine a scrambling sequence for one or more of a reference signal, a control signal, or a data signal, for use in demodulating the common control resource set. In some cases, scrambling sequence identification component 1030 may determine the scrambling sequence for one or more of the reference signal, the control signal, or the data signal, based on a cell ID and slot or subframe index of the signal. In some cases, scrambling sequence identification component 1030 may identify a center frequency of the synchronization channel, and the scrambling sequence for one or more of the reference signal, the control signal, or the data signal, may be determined based on the center frequency of the synchronization channel. In some cases, scrambling sequence identification component 1030 may identify a center frequency of a second synchronization channel transmitted on the second component carrier, and determine the scrambling sequence for one or more of the reference signal, the control signal, or the data signal, for use in demodulating the common control resource set based on the center frequency of the second synchronization channel.

In some cases, scrambling sequence identification component 1030 may identify a reference RE location within the system bandwidth, and generate the scrambling sequence based on the cell ID, the slot or subframe index, and the reference RE location. In some examples, identifying the reference RE location may comprise identifying a constant fixed offset based at least in part on at least one of a PBCH or RMSI. In some cases, the scrambling sequence for one or more of the reference signal, the control signal, or the data signal, is determined independently of a center frequency of the synchronization channel or a center frequency of the system bandwidth. In some cases, the processing one or more of the reference signal, the control signal, or the data signal, includes identifying a cell ID and a slot or subframe index associated with the common control resource set, identifying a center frequency of the synchronization channel, generating the scrambling sequence based on the cell ID, the slot or subframe index, and the center frequency of the synchronization channel, and applying the scrambling sequence to a signal pattern of one or more of the reference signal, the control signal, or the data signal. In some cases, the processing one or more of the reference signal, the control signal, or the data signal, further includes identifying a reference RE associated with a received signal, and filling the scrambling sequence for REs of one or more of the reference signal, the control signal, or the data signal, REs starting at the reference RE based on the generated scrambling sequence. In some examples, identifying the reference RE may comprise identifying a constant fixed offset based at least in part on at least one of a PB CH or RMSI.

Signal processing component 1035 may apply the scrambling sequence to a reference signal REs starting at the reference RE location based on the generated scrambling sequence and process one or more of the reference signal, the control signal, or the data signal, based on the scrambling sequence.

Slot/subframe index component 1040 may determine a cell ID and a slot or subframe index for the common control resource set. In some cases, the slot or subframe index is based on a reference numerology of a set of available numerologies for wireless transmissions within the system bandwidth. In some cases, the reference numerology corresponds to a 15 kHz tone spacing or multiples thereof.

Raster component 1045 may identify a raster of synchronization channel center frequencies within the system bandwidth, identify a center frequency of the synchronization channel as one of the synchronization channel center frequencies on the raster of synchronization channel center frequencies. In some cases, a first synchronization channel center frequency may be identified as a reference RE location within the system bandwidth. In some cases, the first synchronization channel center frequency is selected based on an index of the raster of synchronization channel center frequencies and a parameter that identifies a scrambling sequence or a length of the scrambling sequence.

Figure 11:
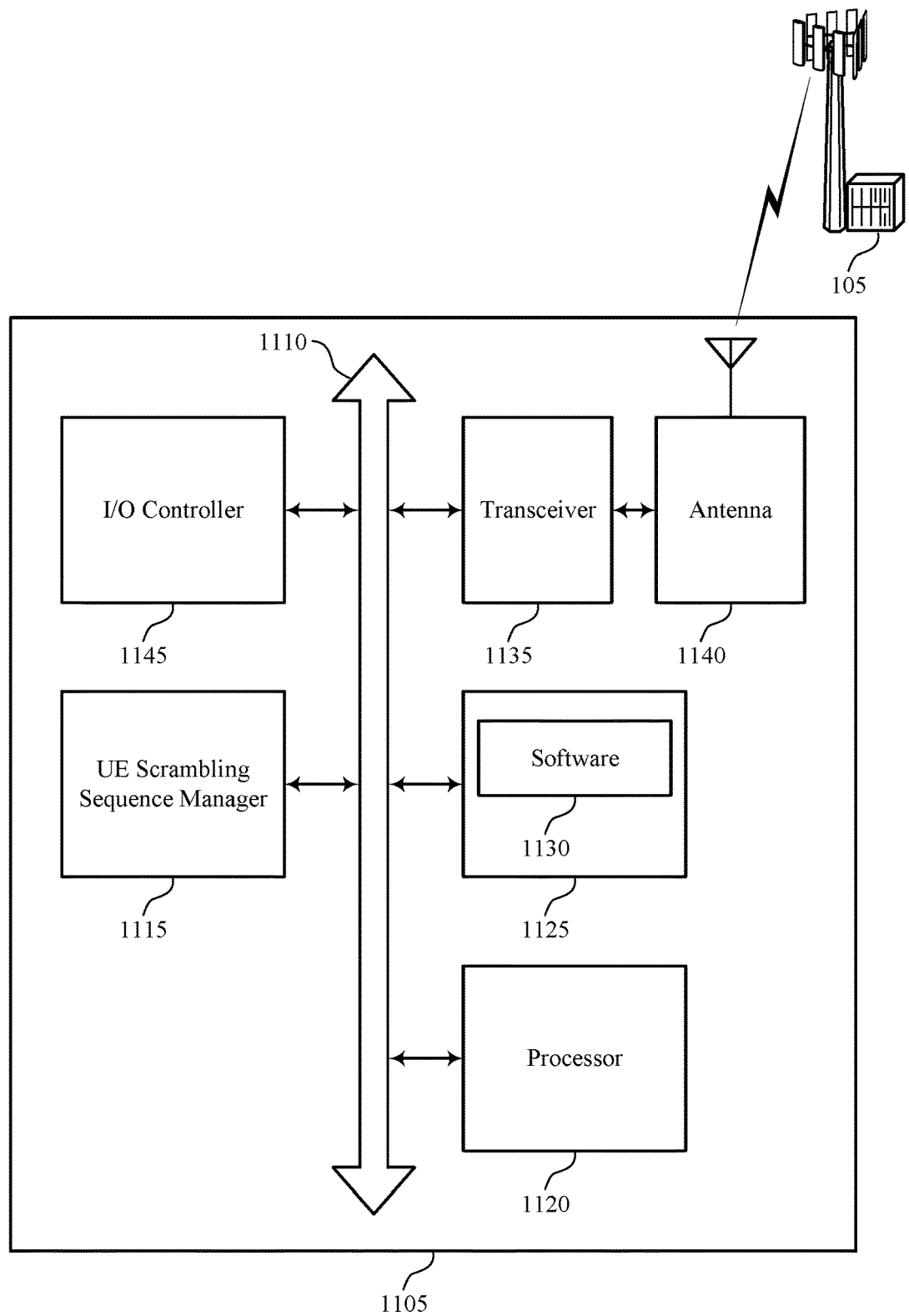
FIG. 11 illustrates a block diagram of a system including a UE that supports signal scrambling sequence techniques for wireless communications in accordance with aspects of the present disclosure.

FIG. 11 shows a diagram of a system 1100 including a device 1105 that supports signal scrambling sequence techniques for wireless communications in accordance with various aspects of the present disclosure. Device 1105 may be an example of or include the components of wireless device 805, wireless device 905, or a UE 115 as described above, e.g., with reference to FIGS. 1, 8 and 9. Device 1105 may include components for bi-directional voice and data communications including components for transmitting and receiving communications, including UE scrambling sequence manager 1115, processor 1120, memory 1125, software 1130, transceiver 1135, antenna 1140, and I/O controller 1145. These components may be in electronic communication via one or more busses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting signal scrambling sequence techniques for wireless communications).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support signal scrambling sequence techniques for wireless communications. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
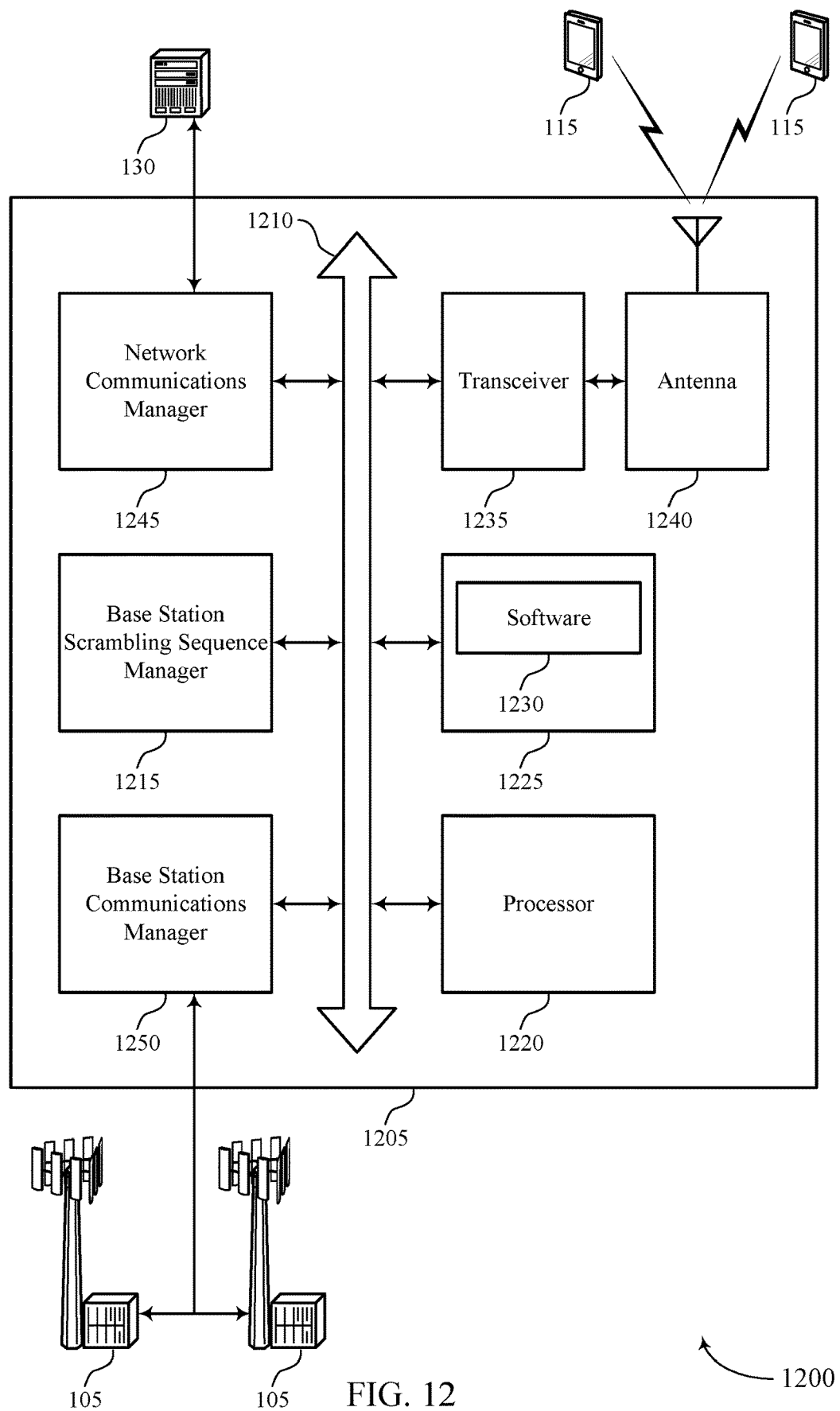
FIG. 12 illustrates a block diagram of a system including a base station that supports signal scrambling sequence techniques for wireless communications in accordance with aspects of the present disclosure.

FIG. 12 shows a diagram of a system 1200 including a device 1205 that supports signal scrambling sequence techniques for wireless communications in accordance with various aspects of the present disclosure. Device 1205 may be an example of or include the components of wireless device 905, wireless device 1005, or a base station 105 as described above, e.g., with reference to FIGS. 1, 9 and 10. Device 1205 may include components for bi-directional voice and data communications including components for transmitting and receiving communications, including base station scrambling sequence manager 1215, processor 1220, memory 1225, software 1230, transceiver 1235, antenna 1240, network communications manager 1245, and base station communications manager 1250. These components may be in electronic communication via one or more busses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting signal scrambling sequence techniques for wireless communications).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support signal scrambling sequence techniques for wireless communications. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Base station communications manager 1250 may manage communications with other base station 105, and may include a controller or scheduler for controlling communications with UEs 115 in cooperation with other base stations 105. For example, the base station communications manager 1250 may coordinate scheduling for transmissions to UEs 115 for various interference mitigation techniques such as beamforming or joint transmission. In some examples, base station communications manager 1250 may provide an X2 interface within an Long Term Evolution (LTE)/LTE-A wireless communication network technology to provide communication between base stations 105.

Figure 13:
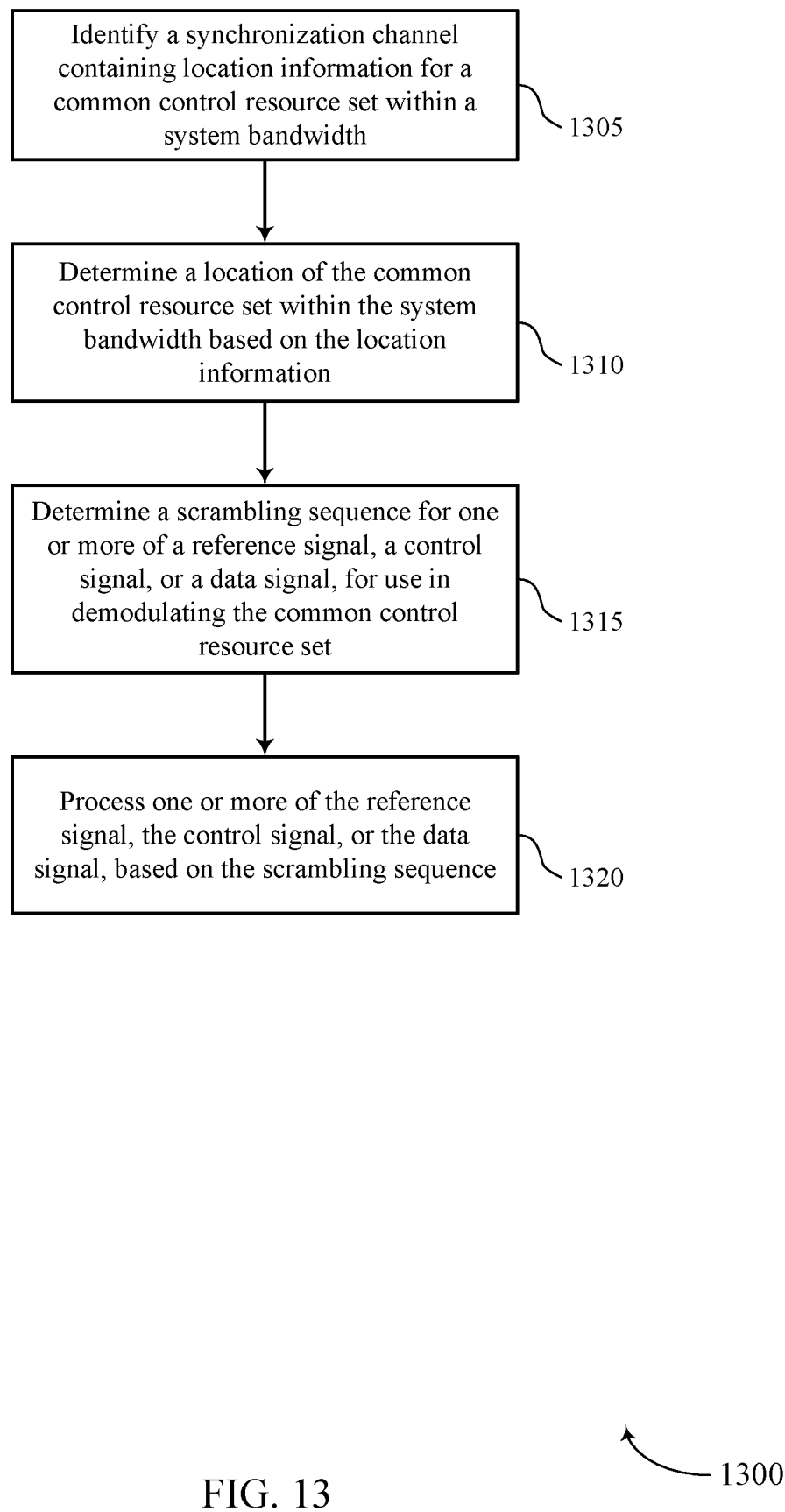
FIGS. 13 through 17 illustrate methods for signal scrambling sequence techniques for wireless communications in accordance with aspects of the present disclosure.

FIG. 13 shows a flowchart illustrating a method 1300 for signal scrambling sequence techniques for wireless communications in accordance with various aspects of the present disclosure. The operations of method 1300 may be implemented by a UE 115 or base station 105 or its components as described herein. For example, the operations of method 1300 may be performed by a scrambling sequence manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305 the UE 115 or base station 105 may identify a synchronization channel containing location information for a common control resource set within a system bandwidth. The operations of block 1305 may be performed according to the methods described with reference to FIGS. 1 through 7. In certain examples, aspects of the operations of block 1305 may be performed by a synchronization channel component as described with reference to FIGS. 8 through 10.

At block 1310 the UE 115 or base station 105 may determine a location of the common control resource set within the system bandwidth based at least in part on the location information. The operations of block 1310 may be performed according to the methods described with reference to FIGS. 1 through 7. In certain examples, aspects of the operations of block 1310 may be performed by a common control resource component as described with reference to FIGS. 8 through 10.

At block 1315 the UE 115 or base station 105 may determine a scrambling sequence for one or more of a reference signal, a control signal, or a data signal, for use in demodulating the common control resource set. The operations of block 1315 may be performed according to the methods described with reference to FIGS. 1 through 7. In certain examples, aspects of the operations of block 1315 may be performed by a scrambling sequence identification component as described with reference to FIGS. 8 through 10.

At block 1320 the UE 115 or base station 105 may process one or more of the reference signal, the control signal, or the data signal, based at least in part on the scrambling sequence. The operations of block 1320 may be performed according to the methods described with reference to FIGS. 1 through 7. In certain examples, aspects of the operations of block 1320 may be performed by a signal processing component as described with reference to FIGS. 8 through 10.

Figure 14:
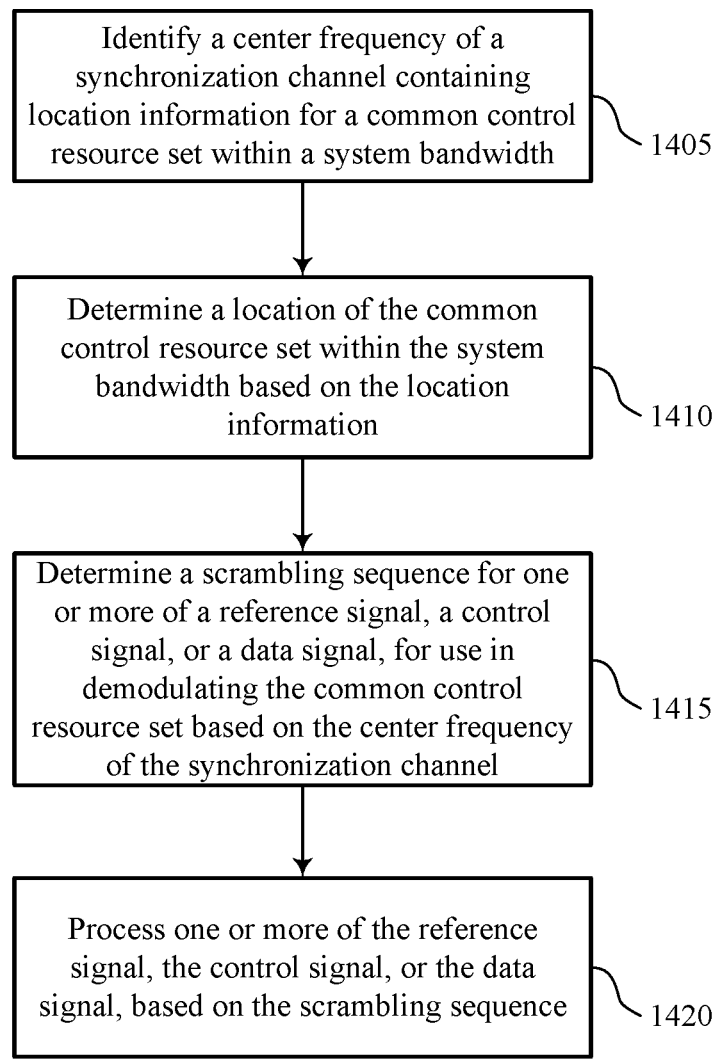

FIG. 14 shows a flowchart illustrating a method 1400 for signal scrambling sequence techniques for wireless communications in accordance with various aspects of the present disclosure. The operations of method 1400 may be implemented by a UE 115 or base station 105 or its components as described herein. For example, the operations of method 1400 may be performed by a scrambling sequence manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1405 the UE 115 or base station 105 may identify a center frequency of a synchronization channel containing location information for a common control resource set within a system bandwidth. The operations of block 1405 may be performed according to the methods described with reference to FIGS. 1 through 7. In certain examples, aspects of the operations of block 1405 may be performed by a synchronization channel component as described with reference to FIGS. 8 through 10.

At block 1410 the UE 115 or base station 105 may determine a location of the common control resource set within the system bandwidth based at least in part on the location information. The operations of block 1410 may be performed according to the methods described with reference to FIGS. 1 through 7. In certain examples, aspects of the operations of block 1410 may be performed by a common control resource component as described with reference to FIGS. 8 through 10.

At block 1415 the UE 115 or base station 105 may determine a scrambling sequence for one or more of a reference signal, a control signal, or a data signal, for use in demodulating the common control resource set based on the center frequency of the synchronization channel. The operations of block 1415 may be performed according to the methods described with reference to FIGS. 1 through 7. In certain examples, aspects of the operations of block 1415 may be performed by a scrambling sequence identification component as described with reference to FIGS. 8 through 10.

At block 1420 the UE 115 or base station 105 may process one or more of the reference signal, the control signal, or the data signal, based at least in part on the scrambling sequence. The operations of block 1420 may be performed according to the methods described with reference to FIGS. 1 through 7. In certain examples, aspects of the operations of block 1420 may be performed by a signal processing component as described with reference to FIGS. 8 through 10.

Figure 15:
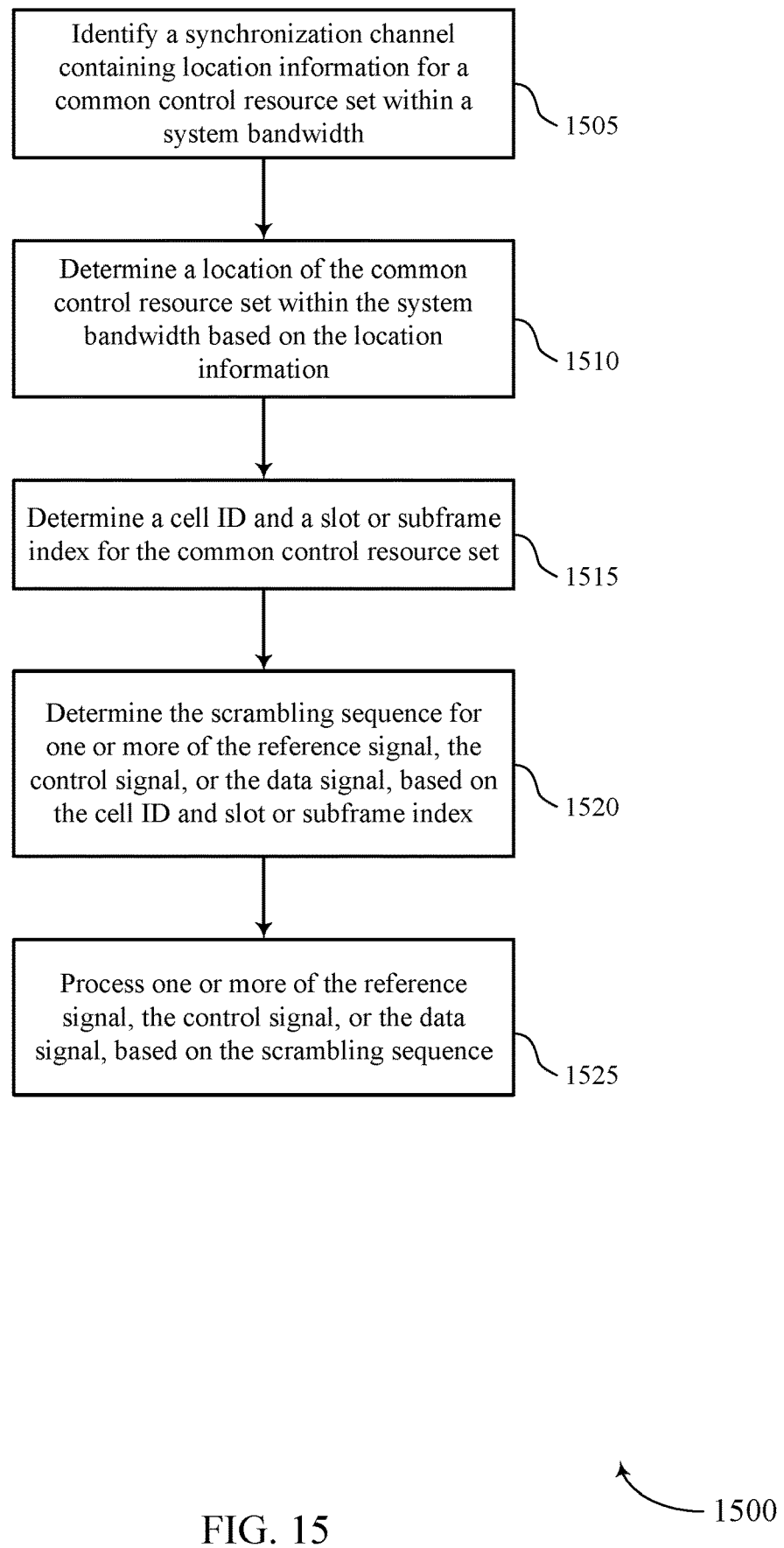

FIG. 15 shows a flowchart illustrating a method 1500 for signal scrambling sequence techniques for wireless communications in accordance with various aspects of the present disclosure. The operations of method 1500 may be implemented by a UE 115 or base station 105 or its components as described herein. For example, the operations of method 1500 may be performed by a scrambling sequence manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1505 the UE 115 or base station 105 may identify a synchronization channel containing location information for a common control resource set within a system bandwidth. The operations of block 1505 may be performed according to the methods described with reference to FIGS. 1 through 7. In certain examples, aspects of the operations of block 1505 may be performed by a synchronization channel component as described with reference to FIGS. 8 through 10.

At block 1510 the UE 115 or base station 105 may determine a location of the common control resource set within the system bandwidth based at least in part on the location information. The operations of block 1510 may be performed according to the methods described with reference to FIGS. 1 through 7. In certain examples, aspects of the operations of block 1510 may be performed by a common control resource component as described with reference to FIGS. 8 through 10.

At block 1515 the UE 115 or base station 105 may determine a cell ID and a slot or subframe index for the common control resource set. The operations of block 1515 may be performed according to the methods described with reference to FIGS. 1 through 7. In certain examples, aspects of the operations of block 1515 may be performed by a slot/subframe index component as described with reference to FIGS. 8 through 10.

At block 1520 the UE 115 or base station 105 may determine the scrambling sequence for one or more of the reference signal, the control signal, or the data signal, based on the cell ID and slot or subframe index. The operations of block 1520 may be performed according to the methods described with reference to FIGS. 1 through 7. In certain examples, aspects of the operations of block 1520 may be performed by a scrambling sequence identification component as described with reference to FIGS. 8 through 10.

At block 1525 the UE 115 or base station 105 may process one or more of the reference signal, the control signal, or the data signal, based at least in part on the scrambling sequence. The operations of block 1525 may be performed according to the methods described with reference to FIGS. 1 through 7. In certain examples, aspects of the operations of block 1525 may be performed by a signal processing component as described with reference to FIGS. 8 through 10.

Figure 16:
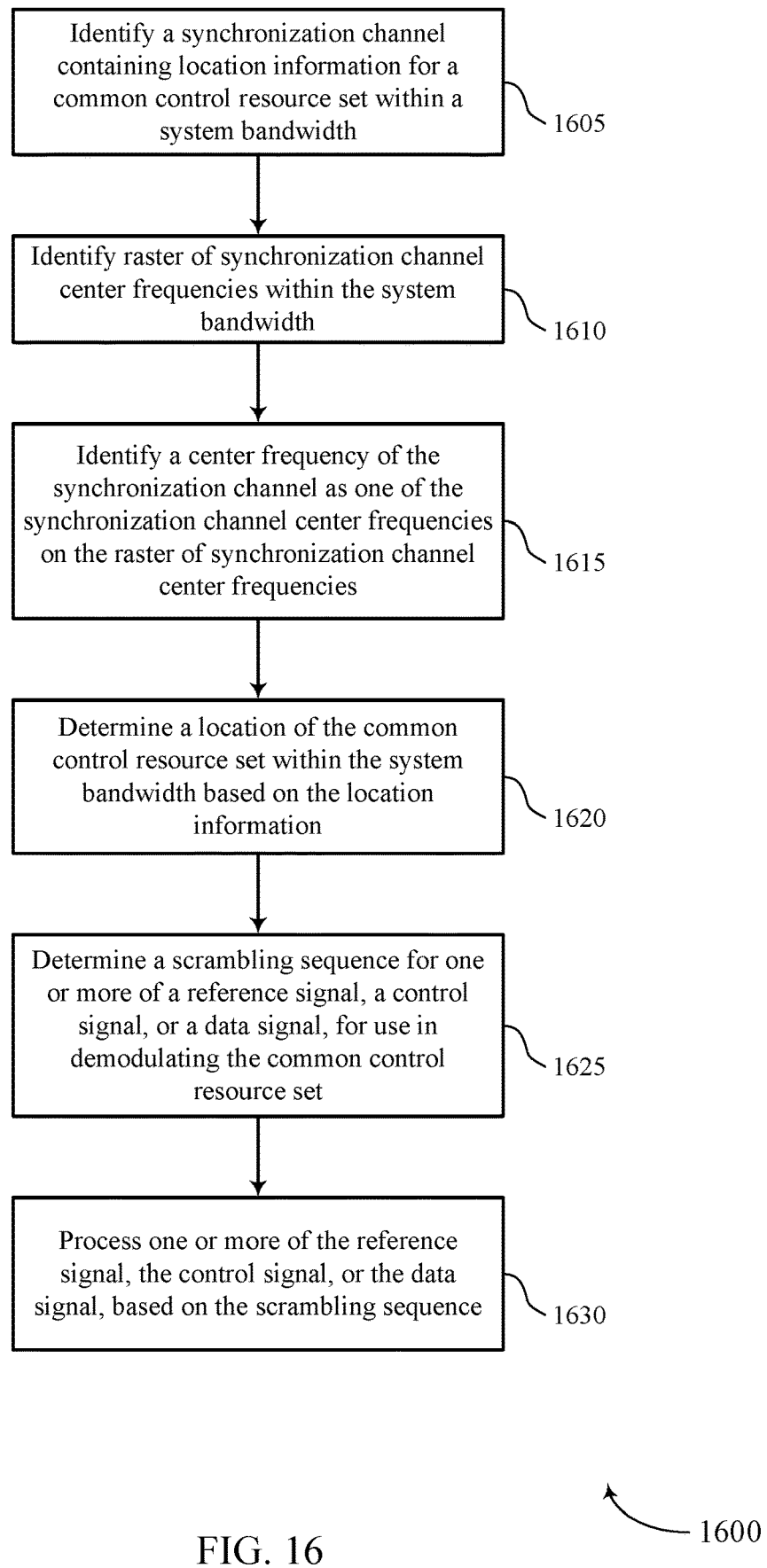

FIG. 16 shows a flowchart illustrating a method 1600 for signal scrambling sequence techniques for wireless communications in accordance with various aspects of the present disclosure. The operations of method 1600 may be implemented by a UE 115 or base station 105 or its components as described herein. For example, the operations of method 1600 may be performed by a scrambling sequence manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1605 the UE 115 or base station 105 may identify a synchronization channel containing location information for a common control resource set within a system bandwidth. The operations of block 1605 may be performed according to the methods described with reference to FIGS. 1 through 7. In certain examples, aspects of the operations of block 1605 may be performed by a synchronization channel component as described with reference to FIGS. 8 through 10.

At block 1610 the UE 115 or base station 105 may identify a raster of synchronization channel center frequencies within the system bandwidth. The operations of block 1610 may be performed according to the methods described with reference to FIGS. 1 through 7. In certain examples, aspects of the operations of block 1610 may be performed by a raster component as described with reference to FIGS. 8 through 10.

At block 1615 the UE 115 or base station 105 may identify a center frequency of the synchronization channel as one of the synchronization channel center frequencies on the raster of synchronization channel center frequencies. The operations of block 1615 may be performed according to the methods described with reference to FIGS. 1 through 7. In certain examples, aspects of the operations of block 1615 may be performed by a raster component as described with reference to FIGS. 8 through 10.

At block 1620 the UE 115 or base station 105 may determine a location of the common control resource set within the system bandwidth based at least in part on the location information. The operations of block 1620 may be performed according to the methods described with reference to FIGS. 1 through 7. In certain examples, aspects of the operations of block 1620 may be performed by a common control resource component as described with reference to FIGS. 8 through 10.

At block 1625 the UE 115 or base station 105 may determine a scrambling sequence for one or more of a reference signal, a control signal, or a data signal, for use in demodulating the common control resource set. The operations of block 1625 may be performed according to the methods described with reference to FIGS. 1 through 7. In certain examples, aspects of the operations of block 1625 may be performed by a scrambling sequence identification component as described with reference to FIGS. 8 through 10.

At block 1630 the UE 115 or base station 105 may process one or more of the reference signal, the control signal, or the data signal, based at least in part on the scrambling sequence. The operations of block 1630 may be performed according to the methods described with reference to FIGS. 1 through 7. In certain examples, aspects of the operations of block 1630 may be performed by a signal processing component as described with reference to FIGS. 8 through 10.

Figure 17:
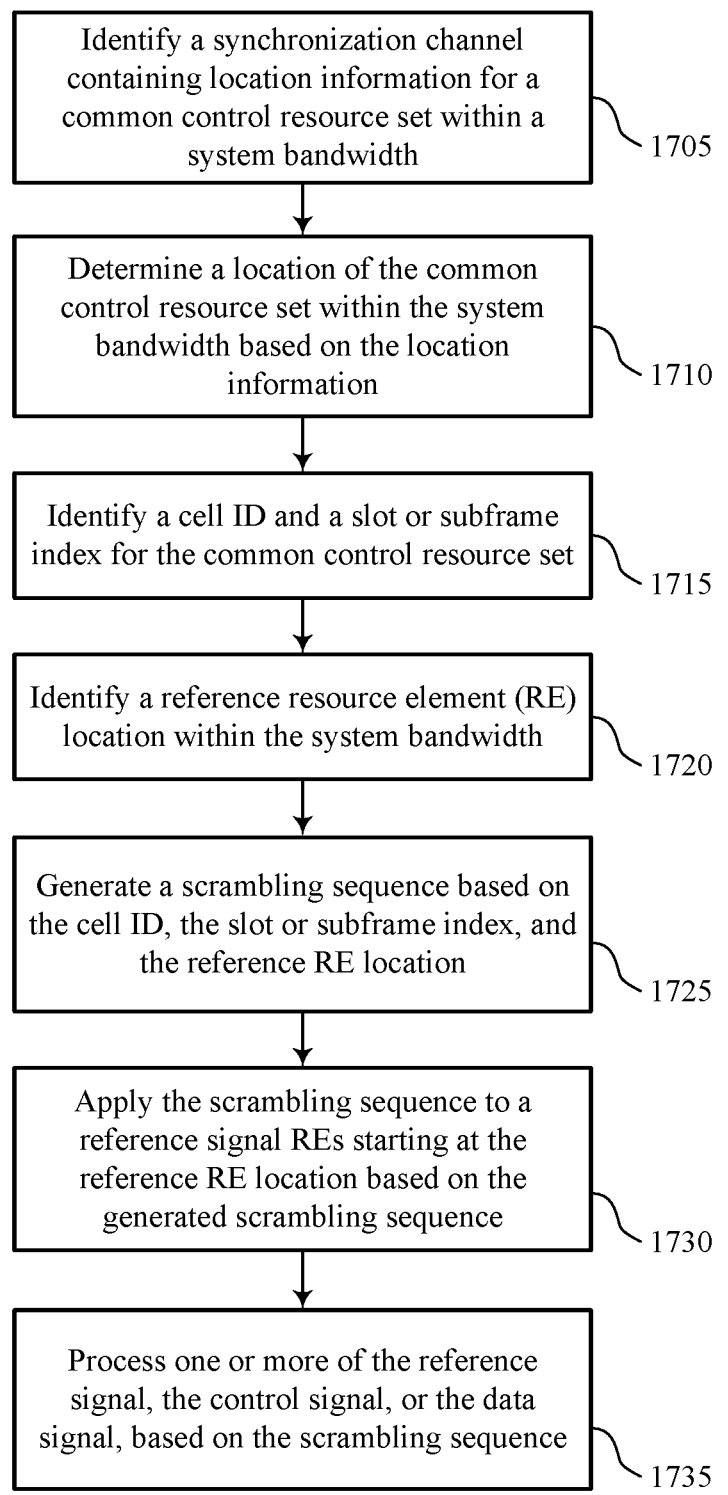

FIG. 17 shows a flowchart illustrating a method 1700 for signal scrambling sequence techniques for wireless communications in accordance with various aspects of the present disclosure. The operations of method 1700 may be implemented by a UE 115 or base station 105 or its components as described herein. For example, the operations of method 1700 may be performed by a scrambling sequence manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1705 the UE 115 or base station 105 may identify a synchronization channel containing location information for a common control resource set within a system bandwidth. The operations of block 1705 may be performed according to the methods described with reference to FIGS. 1 through 7. In certain examples, aspects of the operations of block 1705 may be performed by a synchronization channel component as described with reference to FIGS. 8 through 10.

At block 1710 the UE 115 or base station 105 may determine a location of the common control resource set within the system bandwidth based at least in part on the location information. The operations of block 1710 may be performed according to the methods described with reference to FIGS. 1 through 7. In certain examples, aspects of the operations of block 1710 may be performed by a common control resource component as described with reference to FIGS. 8 through 10.

At block 1715 the UE 115 or base station 105 may identify a cell ID and a slot or subframe index for the common control resource set. The operations of block 1715 may be performed according to the methods described with reference to FIGS. 1 through 7. In certain examples, aspects of the operations of block 1715 may be performed by a slot/subframe index component as described with reference to FIGS. 8 through 10.

At block 1720 the UE 115 or base station 105 may identify a reference RE location within the system bandwidth. The operations of block 1720 may be performed according to the methods described with reference to FIGS. 1 through 7. In certain examples, aspects of the operations of block 1720 may be performed by a scrambling sequence identification component as described with reference to FIGS. 8 through 10.

At block 1725 the UE 115 or base station 105 may generate a scrambling sequence based at least in part on the cell ID, the slot or subframe index, and the reference RE location. The operations of block 1725 may be performed according to the methods described with reference to FIGS. 1 through 7. In certain examples, aspects of the operations of block 1725 may be performed by a scrambling sequence identification component as described with reference to FIGS. 8 through 10. In some examples, identifying the reference RE location may comprise identifying a constant fixed offset based at least in part on at least one of a PBCH or RMSI.

At block 1730 the UE 115 or base station 105 may apply the scrambling sequence to a reference signal REs starting at the reference RE location based on the generated scrambling sequence. The operations of block 1730 may be performed according to the methods described with reference to FIGS. 1 through 7. In certain examples, aspects of the operations of block 1730 may be performed by a signal processing component as described with reference to FIGS. 8 through 10.

At block 1735 the UE 115 or base station 105 may process one or more of the reference signal, the control signal, or the data signal, based at least in part on the scrambling sequence. The operations of block 1735 may be performed according to the methods described with reference to FIGS. 1 through 7. In certain examples, aspects of the operations of block 1735 may be performed by a signal processing component as described with reference to FIGS. 8 through 10.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a synchronization channel containing location information for a common control resource set within a system bandwidth;
   determining a location of the common control resource set within the system bandwidth based at least in part on the location information and a reference numerology;
   identifying a center frequency of a wireless channel;
   determining, based at least in part on the identified center frequency, a scrambling sequence for one or more of a reference signal, a control signal, or a data signal, for use in demodulating the common control resource set; and
   processing one or more of the reference signal, the control signal, or the data signal, based at least in part on the scrambling sequence.

2. The method of claim 1, wherein the wireless channel comprises the synchronization channel, and wherein:
   the center frequency of the wireless channel is different than a center frequency of the system bandwidth.

3. The method of claim 1, wherein the wireless channel comprises the synchronization channel, and wherein:
   the center frequency of the wireless channel is the same as a center frequency of the system bandwidth.

4. The method of claim 1, further comprising:
   identifying a raster of synchronization channel center frequencies within the system bandwidth; and
   identifying the center frequency of the wireless channel as one of the synchronization channel center frequencies on the raster of the synchronization channel center frequencies, wherein the wireless channel comprises the synchronization channel.

5. The method of claim 1, wherein the wireless channel comprises the synchronization channel, further comprising:
   identifying a cell ID, a slot index, or a subframe index associated with the common control resource set;
   generating the scrambling sequence based at least in part on the cell ID, the slot index, or the subframe index, and the center frequency of the wireless channel, wherein determining the scrambling sequence is based at least in part on the generating; and
   applying the scrambling sequence to a signal pattern of one or more of the reference signal, the control signal, or the data signal, wherein processing the one or more of the reference signal, the control signal, or the data signal, is based at least in part on applying the scrambling sequence to the signal pattern.

6. The method of claim 1, wherein the processing one or more of the reference signal, the control signal, or the data signal, further comprises:
   identifying a reference resource element (RE) associated with a received signal; and
   filling the scrambling sequence for REs of one or more of the reference signal, the control signal, or the data signal, starting at the reference RE based on the scrambling sequence.

7. The method of claim 6, further comprising:
   receiving, in a physical broadcast channel (PBCH), or remaining minimum system information (RMSI), or a combination thereof, an indication of a constant fixed offset from the synchronization channel, wherein identifying the reference RE is based at least in part on the constant fixed offset.

8. The method of claim 1, further comprising:
identifying that the common control resource set is transmitted on a second carrier that is different than a first carrier used to transmit the synchronization channel, wherein the wireless channel comprises a second synchronization channel, wherein determining the scrambling sequence for one or more of the reference signal, the control signal, or the data signal, for use in demodulating the common control resource set is based at least in part on the center frequency of the second synchronization channel.

9. The method of claim 8, further comprising:
receiving, from a base station, an indication of the second synchronization channel, wherein identifying the center frequency of the second synchronization channel is based at least in part on the indication.

10. An apparatus for wireless communication, in a system comprising:
a processor;
memory in electronic communication with the processor; and
instructions stored in the memory and operable, when executed by the processor, to cause the apparatus to:
identify a synchronization channel containing location information for a common control resource set within a system bandwidth;
determine a location of the common control resource set within the system bandwidth based at least in part on the location information and a reference numerology;
identify a center frequency of a wireless channel;
determine, based at least in part on the identified center frequency, a scrambling sequence for one or more of a reference signal, a control signal, or a data signal, for use in demodulating the common control resource set; and
processing one or more of the reference signal, the control signal, or the data signal, based at least in part on the scrambling sequence.

11. The apparatus of claim 10, wherein the wireless channel comprises the synchronization channel, and wherein:
the center frequency of the wireless channel is different than a center frequency of the system bandwidth.

12. The apparatus of claim 10, wherein the wireless channel comprises the synchronization channel, and wherein:
the center frequency of the wireless channel is the same as a center frequency of the system bandwidth.

13. The apparatus of claim 10, wherein the instructions are further executable by the processor to cause the apparatus to:
identify a raster of synchronization channel center frequencies within the system bandwidth; and
identify the center frequency of the wireless channel as one of the synchronization channel center frequencies on the raster of synchronization channel center frequencies, wherein the wireless channel comprises the synchronization channel.

14. The apparatus of claim 10, wherein the instructions are further executable by the processor to cause the apparatus to:
identify a cell ID, a slot index, or a subframe index associated with the common control resource set;
generate the scrambling sequence based at least in part on the cell ID, the slot index, or the subframe index, and the center frequency of the wireless channel, wherein determining the scrambling sequence is based at least in part on the generating; and
apply the scrambling sequence to a signal pattern of one or more of the reference signal, the control signal, or the data signal, wherein processing the one or more of the reference signal, the control signal, or the data signal, is based at least in part on applying the scrambling sequence to the signal pattern.

15. The apparatus of claim 10, wherein the instructions to process one or more of the reference signal, the control signal, or the data signal, are further executable by the processor to cause the apparatus to:
identify a reference resource element (RE) associated with a received signal; and
fill the scrambling sequence for REs of one or more of the reference signal, the control signal, or the data signal, starting at the reference RE based on the scrambling sequence.

16. The apparatus of claim 15, wherein the instructions are further executable by the processor to cause the apparatus to:
receive, in a physical broadcast channel (PBCH), or remaining minimum system information (RMSI), or a combination thereof, an indication of a constant fixed offset from the synchronization channel, wherein identifying the reference RE is based at least in part on the constant fixed offset.

17. The apparatus of claim 10, wherein the instructions are further executable by the processor to cause the apparatus to:
identify that the common control resource set is transmitted on a second carrier that is different than a first carrier used to transmit the synchronization channel, wherein the wireless channel comprises a second synchronization channel, wherein determining the scrambling sequence for one or more of the reference signal, the control signal, or the data signal, for use in demodulating the common control resource set is based at least in part on the center frequency of the second synchronization channel.

18. The apparatus of claim 17, wherein the instructions are further executable by the processor to cause the apparatus to:
receive, from a base station, an indication of the second synchronization channel, wherein identifying the center frequency of the second synchronization channel is based at least in part on the indication.

19. An apparatus for wireless communication, comprising:
means for identifying a synchronization channel containing location information for a common control resource set within a system bandwidth;
means for determining a location of the common control resource set within the system bandwidth based at least in part on the location information and a reference numerology;
means for identifying a center frequency of a wireless channel;
means for determining, based at least in part on the identified center frequency, a scrambling sequence for one or more of a reference signal, a control signal, or a data signal, for use in demodulating the common control resource set; and
means for processing one or more of the reference signal, the control signal, or the data signal, based at least in part on the scrambling sequence.

20. The apparatus of claim 19, wherein the wireless channel comprises the synchronization channel, and wherein:
the center frequency of the wireless channel is different than a center frequency of the system bandwidth.

21. The apparatus of claim 19, wherein the wireless channel comprises the synchronization channel, and wherein:
the center frequency of the wireless channel is the same as a center frequency of the system bandwidth.

22. The apparatus of claim 19, further comprising:
means for identifying a raster of synchronization channel center frequencies within the system bandwidth; and
means for identifying the center frequency of the wireless channel as one of the synchronization channel center frequencies on the raster of synchronization channel center frequencies, wherein the wireless channel comprises the synchronization channel.

23. The apparatus of claim 20, wherein the means for processing one or more of the reference signal, the control signal, or the data signal, further comprise:
means for identifying a reference resource element (RE) associated with a received signal; and
means for filling the scrambling sequence for REs of one or more of the reference signal, the control signal, or the data signal, starting at the reference RE based on the scrambling sequence.

24. The apparatus of claim 23, further comprising:
means for receiving, in a physical broadcast channel (PBCH), or remaining minimum system information (RMSI), or a combination thereof, an indication of a constant fixed offset from the synchronization channel, wherein identifying the reference RE is based at least in part on the constant fixed offset.

25. The apparatus of claim 20, further comprising:
means for identifying that the common control resource set is transmitted on a second carrier that is different than a first carrier used to transmit the synchronization channel, wherein the wireless channel comprises a second synchronization channel, wherein determining the scrambling sequence for one or more of the reference signal, the control signal, or the data signal, for use in demodulating the common control resource set is based at least in part on the center frequency of the second synchronization channel.

26. The apparatus of claim 25, further comprising:
means for receiving, from a base station, an indication of the second synchronization channel, wherein identifying the center frequency of the second synchronization channel is based at least in part on the indication.

27. A non-transitory computer readable medium storing code for wireless communication, the code comprising instructions executable by a processor to:
identify a synchronization channel containing location information for a common control resource set within a system bandwidth;
determine a location of the common control resource set within the system bandwidth based at least in part on the location information and a reference numerology;
identify a center frequency of a wireless channel;
determine, based at least in part on the identified center frequency, a scrambling sequence for one or more of a reference signal, a control signal, or a data signal, for use in demodulating the common control resource set; and
process one or more of the reference signal, the control signal, or the data signal, based at least in part on the scrambling sequence.

28. The non-transitory computer readable medium of claim 27, wherein the instructions are further executable by the processor to:
identify a raster of synchronization channel center frequencies within the system bandwidth; and
identify the center frequency of the wireless channel as one of the synchronization channel center frequencies on the raster of synchronization channel center frequencies, wherein the wireless channel comprises the synchronization channel.

29. The non-transitory computer readable medium of claim 27, wherein the instructions to process one or more of the reference signal, the control signal, or the data signal, are further executable by the processor to:
identify a reference resource element (RE) associated with a received signal; and
fill the scrambling sequence for REs of one or more of the reference signal, the control signal, or the data signal, starting at the reference RE based on the scrambling sequence.

* * * * *